US011361532B1

(12) United States Patent
Martin et al.

(10) Patent No.: US 11,361,532 B1
(45) Date of Patent: Jun. 14, 2022

(54) SYSTEM AND METHOD FOR OCR BASED OBJECT REGISTRATION

(71) Applicant: Idemia Identity & Security USA LLC, Billerica, MA (US)

(72) Inventors: Brian K. Martin, McMurray, PA (US); Joseph Mayer, Passaic, NJ (US); Rein-Lien Hsu, Edison, NJ (US)

(73) Assignee: Idemia Identity & Security USA LLC, Billerica, MA (US)

( * ) Notice: Subject to any disclaimer, the term of this patent is extended or adjusted under 35 U.S.C. 154(b) by 0 days.

(21) Appl. No.: 16/863,683

(22) Filed: Apr. 30, 2020

(51) Int. Cl.
| | |
|---|---|
| *G06V 10/75* | (2022.01) |
| *G06T 7/70* | (2017.01) |
| *G06K 9/62* | (2022.01) |
| *G06T 3/60* | (2006.01) |
| *G06T 3/40* | (2006.01) |
| *G06T 7/13* | (2017.01) |
| *G06T 7/12* | (2017.01) |
| *G06T 7/33* | (2017.01) |
| *G06T 3/20* | (2006.01) |
| *G06V 30/418* | (2022.01) |
| *G06V 30/10* | (2022.01) |

(52) U.S. Cl.
CPC ....... *G06V 10/7515* (2022.01); *G06K 9/6215* (2013.01); *G06T 3/20* (2013.01); *G06T 3/40* (2013.01); *G06T 3/60* (2013.01); *G06T 7/12* (2017.01); *G06T 7/13* (2017.01); *G06T 7/33* (2017.01); *G06T 7/70* (2017.01); *G06V 30/418* (2022.01); *G06T 2207/30176* (2013.01); *G06V 30/10* (2022.01)

(58) Field of Classification Search
CPC .............. G06K 9/6203; G06K 9/6215; G06K 9/00483; G06K 2209/01; G06T 7/70; G06T 7/12; G06T 3/60; G06T 7/13; G06T 7/33; G06T 3/40; G06T 3/20; G06T 2207/30176; G06V 10/7515; G06V 30/418; G06V 30/10
See application file for complete search history.

(56) References Cited

U.S. PATENT DOCUMENTS

| | | | | |
|---|---|---|---|---|
| 10,438,083 | B1 * | 10/2019 | Rivard | ................. G06K 9/3258 |
| 2016/0148074 | A1 * | 5/2016 | Jean | ..................... G06K 9/4676 |
| | | | | 382/190 |
| 2017/0330030 | A1 * | 11/2017 | Kalyuzhny | ........ G06K 9/00483 |
| 2019/0005323 | A1 * | 1/2019 | Kimura | ................. G06T 3/0006 |
| 2019/0156156 | A1 * | 5/2019 | Tang | .................... G06K 9/6267 |

\* cited by examiner

*Primary Examiner* — Chan S Park
*Assistant Examiner* — Daniel C Chang
(74) *Attorney, Agent, or Firm* — Robert Facey; Adam Lewental

(57) ABSTRACT

Some implementations of the present disclosure are directed to a computer-implemented method that includes: detecting a plurality of characters from a photo of an object; generating a set of character-based features based on the plurality of characters; matching the set of character-based features with a template of feature sets obtained from known objects; based on a matching set of character-based features, establishing a matching transformation between the object in the photo and the template of feature sets; and projecting the matching transformation to the photo such that the object is segmented from the photo.

6 Claims, 21 Drawing Sheets

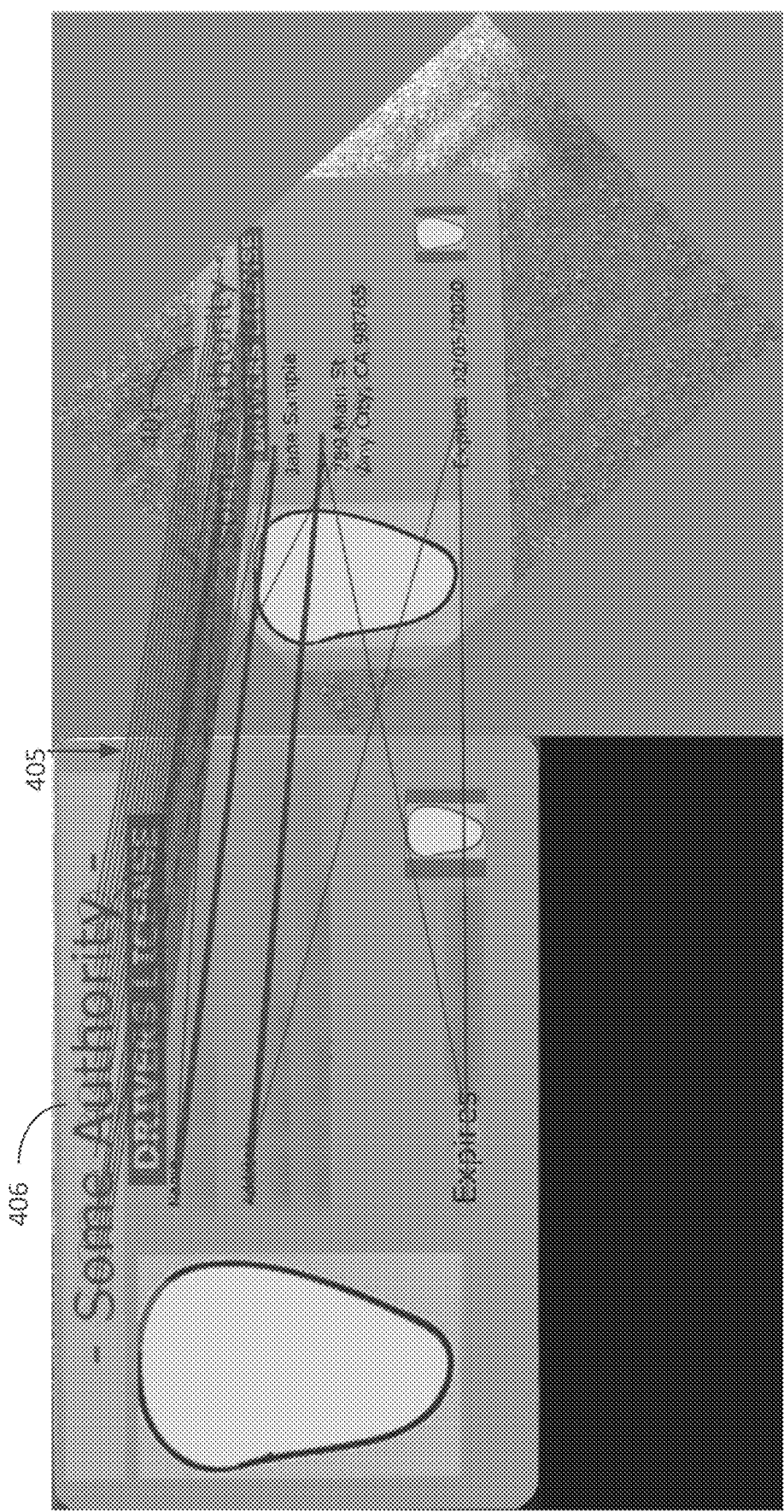

SYSTEM AND METHOD FOR OCR BASED OBJECT REGISTRATION

TECHNICAL FIELD

This disclosure generally relates to computer vision and more specifically, object detection and registration.

BACKGROUND

Objection detection and registration attempt to address a long standing problem of determining the location of an object within a digital image. Despite progresses made by methodologies involving the use of generalized feature extractors such as SIFT, in many applications, objection detection and registration are still plagued by, for example, noise in the input images.

SUMMARY

In one aspect, some implementations of the present disclosure are directed to a computer-implemented method that includes: detecting a plurality of characters from a photo of an object; generating a set of character-based features based on the plurality of characters; matching the set of character-based features with a template of feature sets obtained from known objects; based on a matching set of character-based features, establishing a matching transformation between the object in the photo and the template of feature sets; and projecting the matching transformation to the photo such that the object is segmented from the photo.

Implementations may include one or more of the following features. The object may include: an identification document. Generating a set of character-based features may include: receiving a specification of a first set of characters from an operator. The first set of characters may include: a triplet of characters. Generating a set of character-based features may include: estimating spatial coordinates for each character from the first set of characters. The method may further include: in response to finding no matching set of character-based features based on the first set of characters, receiving a specification of a second set of characters from an operator.

The matching can generate a list of matching candidates. The list of matching candidates are ranked based on a respective similarity score for each matching candidate. The respective similarity score can include a textual match with respect to the matching candidate, and a locational match with respect to the matching candidate.

Establishing a matching transformation may include establishing a homography between the object in the photo and the template of feature sets. The homography is capable of projecting a rotation of the photo, a translation of the photo, and a scaling of the photo. Projecting the matching transformation may identify one or more edges of object in the photo, and wherein the one or more edges are sufficient for segmenting the object from the photo. The computer-implemented method may further include receiving data encoding the photo of the object from a user device.

In another aspect, some implementations of the present disclosure are directed to a computer-implemented method that includes: generating a set of character-based features extracted from an object in a photo; based on, at least in part, the set of character-based features, identifying a matching transformation capable of being projected to the photo containing the object such that the objected is segmented from the photo; and in response to identifying the matching transformation, providing, to a template of feature sets, the set of character-based features extracted from the object in the photo.

Implementations may include one of more of the following features. The object may include: an identification document. The computer-implemented method may further include: matching the template of feature sets with a later set of character-based features extracted from an object in a later received photo; based on a matching set of character-based features, establishing a later matching transformation between the object in the later received photo and the template of feature sets; and projecting the subsequent matching transformation to the later received photo such that the object on the later received photo is segmented from the later received photo. The computer-implemented method may further include: providing, to the template of feature sets, the later set of character-based features extracted from the object in the later received photo. The set of characters may include: a triplet of characters. Generating a set of character-based features may include: estimating spatial coordinates for each character from the set of characters. Identifying a matching transformation may include: identifying a homography capable of projecting a rotation of the photo, a translation of the photo, and a scaling of the photo.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

FIGS. 4A to 4G illustrate examples of illustrate examples of performing object detection and registration from a second input condition according to an implementation of the present disclosure.

Like reference numbers and designations in the various drawings indicate like elements.

DETAILED DESCRIPTION

Object detection and registration is a longstanding computer vision problem. This problem can be characterized as determining the location of an object within a digital image. For example, object detection and registration can be used in SnapChat filters where virtual sunglasses, or other items, are rendered over a face. For such rendering to proceed, the features of the face are expected to detected and registered. Numerous approaches existed for performing object detection and registration in digital images. For example, some approaches may incorporate the use of generalized feature extractors such as shift invariant feature transform (SIFT). These approaches are generally designed around graphical objects and are focused on best matching correspondences. As a result, these approaches tend to be highly tuned to specific graphical features that are hard to adjust. To detect a different object, a new template needs to be constructed by extracting the SIFT features. Additionally, these approaches generally require very favorable signal to noise ratio (SNR) in the digital images in order for the object detection to operate smoothly. Moreover, approaches that incorporate SIFT and convolutional neural network (CNN), often uses features extracted by an algorithm. As such, such approaches generally stymie manual adjustment/placement of features in the template.

Implementations of the present disclosure may introduce the ability to use human-generated features (such as the text itself) to improve object detection and registration in a digital image. These easy-to-understand features are also easy to adjust. For example, implementations can incorporate optical character recognition (OCR) to discern textual objects, as well as the corresponding locations, in a digital image. Implementations can particularly handle objection detection and registration when the SNR in less than ideal, for example, illumination condition is dimmer than expected or imaging focus is more blurry than anticipated. Moreover, the human-generated features can also facilitate template building for subsequent textual objects detection and registration.

Figure 1:
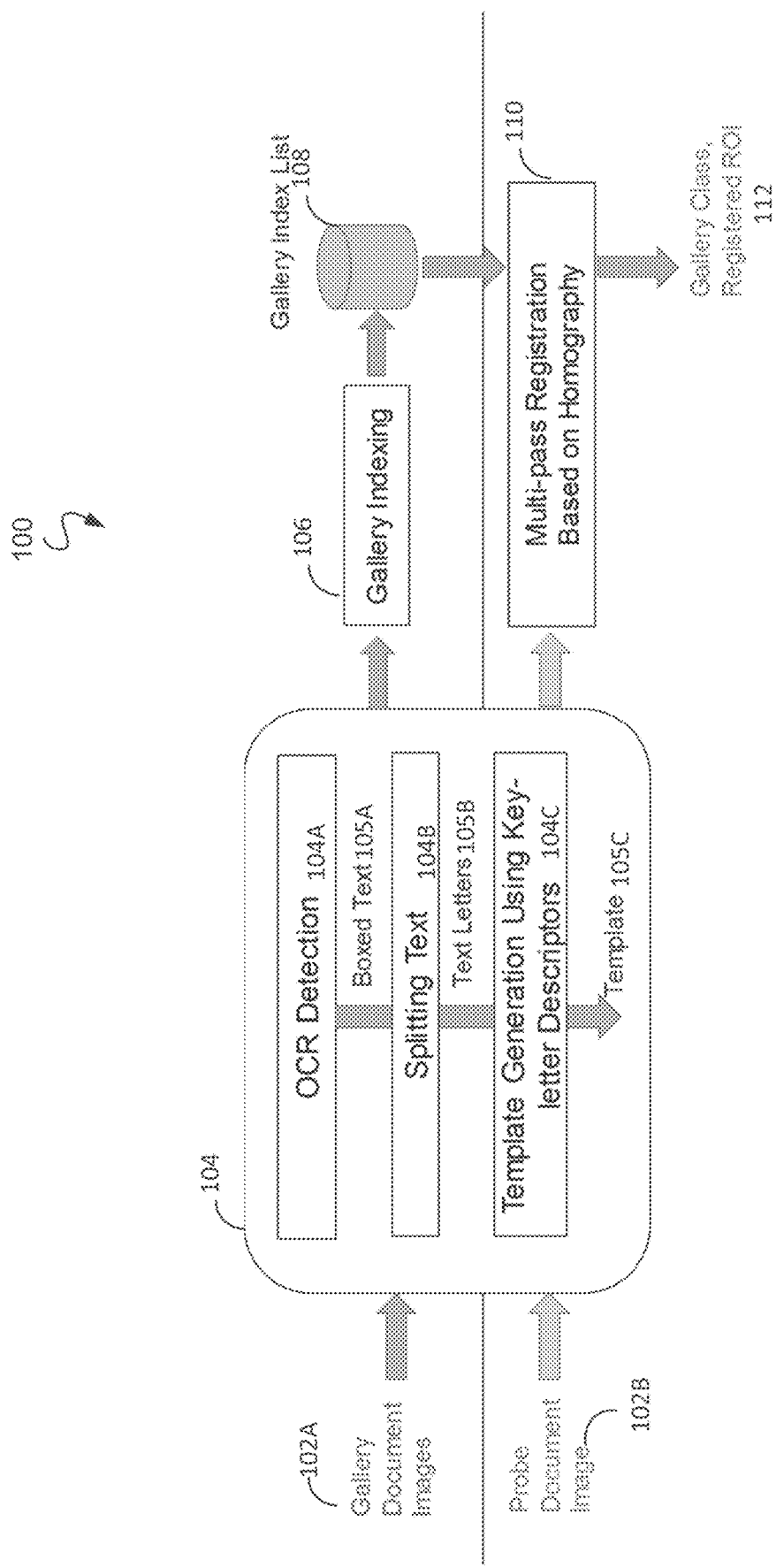
FIG. 1 illustrates an example of a flowchart of performing object detection and registration according to an implementation of the present disclosure.

Referring to FIG. 1, an example of a chart 100 illustrate a typical workflow according to some implementations of the present disclosure. Gallery document images 102A are provided to analytic engine 104. The gallery document images 102A can include a set of digital images, for example, photos containing an identification document. The set can encompass thousands, million, or even more digital images. These digital images can be taken, for example, by consumer users attempting to use their identification documents to back up a claim of identity in an on-line transaction. In one example, the on-line transaction may involve filing a reimbursement request while using a digital photo taken from the claimant's smartphone device to assert an identity of the claimant. Other examples can include claiming a social security benefit, claiming an unemployment benefit, applying for a loan, applying for a financial aid, and requesting document production. Understandably, the digital photos taken by the claimants can have a range of issues in terms of illumination, focus, orientation, and background. When a probe document image 102B is presented, the analytic engine 104 can provide the best matching to detect and register objects inside the submitted probe document image.

Figure 2A:
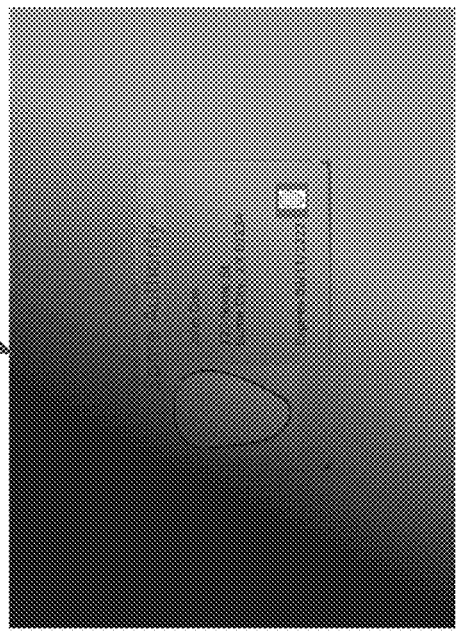
FIGS. 2A to 2D illustrate various examples of input conditions for document registration according to some implementations of the present disclosure.
Figure 2B:
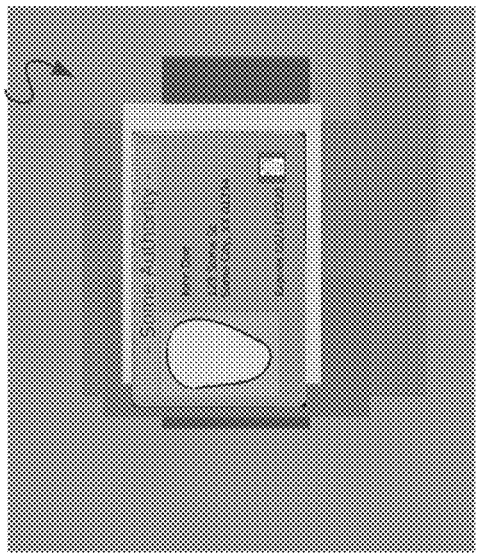
Figure 2C:
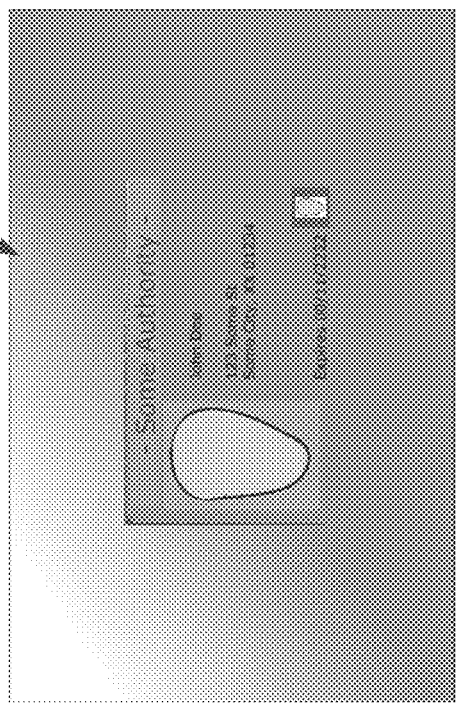
Figure 2D:
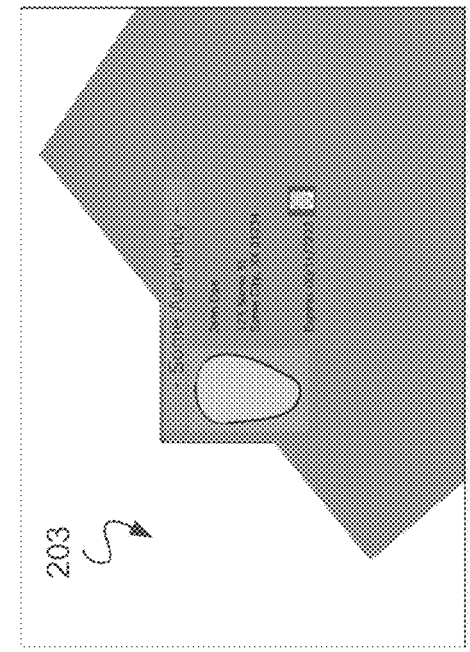

Analytic engine 104 may reside on a server. Analytic engine 104 may also represent software as a service and reside in the cloud. Referring to FIGS. 2A to 2D, a photo of the identification document can be captured in a various conditions. In the example 201 of FIG. 2A, the consumer user may take a photo of the identification document with relatively adequate but varying illumination. This is evidenced by the low contrast around the boundaries of the identification document, even though the identification document is oriented in a generally straight manner towards the center of the field of view. Other examples further illustrate additional conditions. As illustrated by example 202 in FIG. 2B, the photo may be taken with varying illumination over the identification document such that part of the identification is obscured by the lighting condition, for example, in the shadow. In the example 203 of FIG. 2C, the identification document may be taken with portions of the boundaries almost indistinguishable from the immediately surrounding background. Example 204 in FIG. 2D illustrates a cluttered desktop, which compounds the detection of boundaries of the identification document.

Returning to FIG. 1, the primary goal is to detect an identification document in an image. Faced with the imperfections in photos taken by average consumers and then uploaded for analysis, various detection and registration approaches may suffer from feature instability due to noise in the image or differences in the capture. As a result, false features can be detected, hampering the precision of object detection and registration. Specifically, approaches that rely on edge detection can fail when contrast is low between the object and the background. Likewise, approaches such as SIFT often suffer from algorithm derived features that are easily confused and mismatched. These algorithm derived features are not easily understandable by a human operator, let alone capable of being manipulated by a human operator. CNN-based approaches may not yield the accuracy in terms of registration accuracy (e.g., localization of the object). Additionally, in terms of feature definition, the operation of these approaches likewise resemble a black-box and without adequate visibility to a human operator.

The analytic engine 104 can perform optical character recognition (OCR) detection on a photo containing the identification document (104A). The OCR example can generate boxed text (105A) on the photo. Extracting OCR information from the image including extracting the text characters and character location. For example, the detected text can be split from the photo (104B). The text letters (105B), as well as location information quantifying, for example, the coordinate information of the text letters in the photo, can drive template generation using key letter descriptors (104C). The template generation (104C) can generate character based features for all text in the image. An example can include letter triplets and the x,y coordinate location of each letter in the corresponding photo. A template (105C) can be constructed based on a large set of input gallery document images (102A). A template construction process may undergo gallery indexing (106) to yield a gallery index list (108) for the generated template.

A probe document image 102B may correspond to an individual photo taken by an average consumer and submitted for server side processing. The incoming photo containing an identification document can be OCR processed (104A) to yield boxed text (105A), which may then be split (104B) into text letters (105B). An example can include letter triplets and the x,y coordinate location of each letter in the incoming photo. The analytic engine 104 may then match features extracted from the incoming photo against a feature template library to identify a match based on the homography between the image and the pre-defined feature template. An example of this matching process is the multi-pass registration 110 based on homography between the image and the pre-defined feature template. In some cases, a list of good matches are ranked and provided to the human operator. The list can include, for example, the top ten (10) matches, or the top 5 matches above a threshold level. As a result of the match and operator feedback, a gallery class and ROI (112) defining the identification document can be provided on the incoming photo to detect and register the identification document for additional processing, as further illustrated in FIGS. 3 to 6.

Figure 3A:
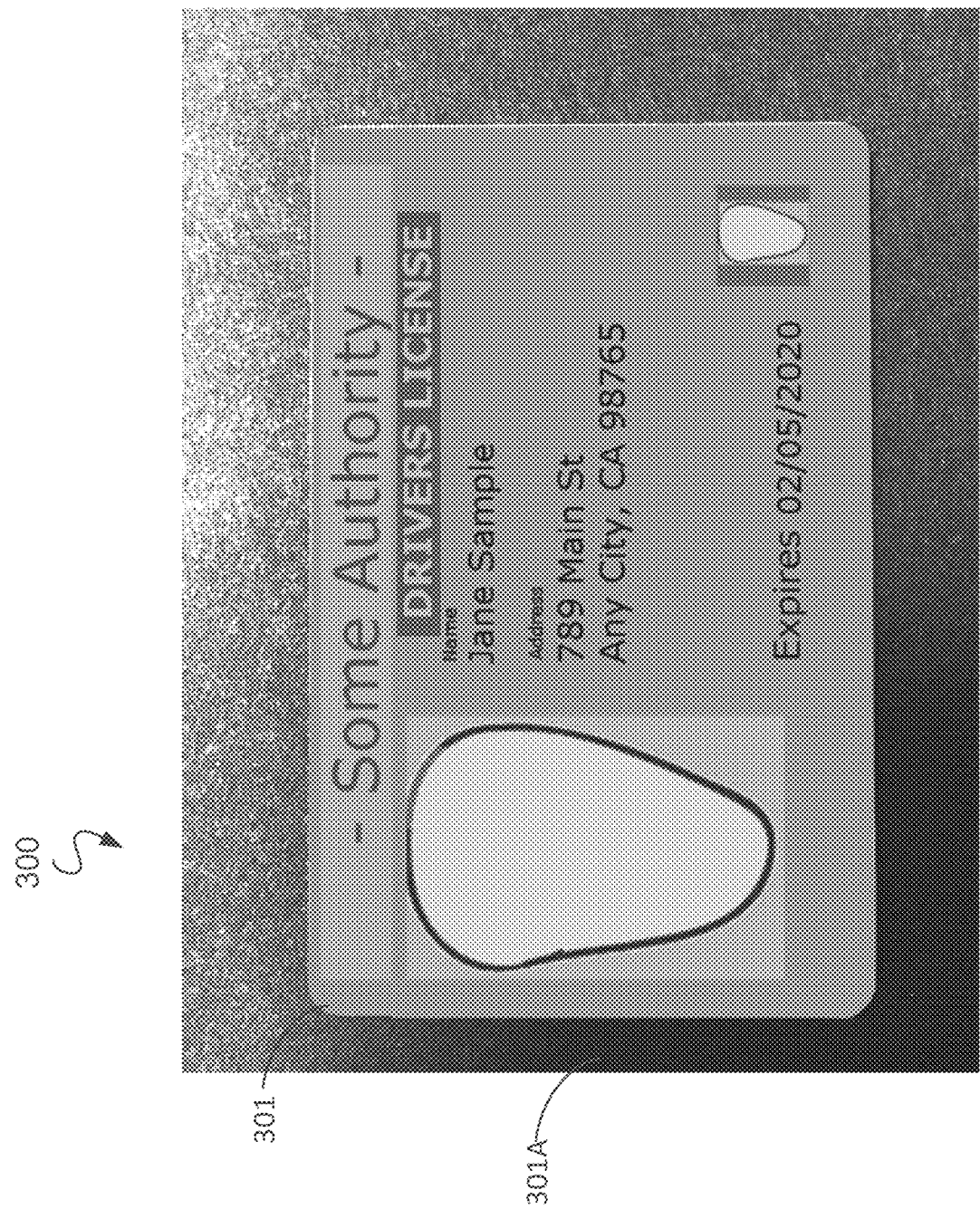
FIGS. 3A to 3G illustrate examples of performing object detection and registration from a first input condition according to an implementation of the present disclosure.

Referring to FIGS. 3A to 3G, steps are illustrated for performing object detection and registration from a first input condition according to an implementation of the present disclosure. FIG. 3A shows an example photo 300 of identification document 301 arranged on background 301A. This example represents a case in which the identification document 301 is relatively positioned towards the center of the field of view, and the background 301A is relatively well illuminated.

Figure 3B:
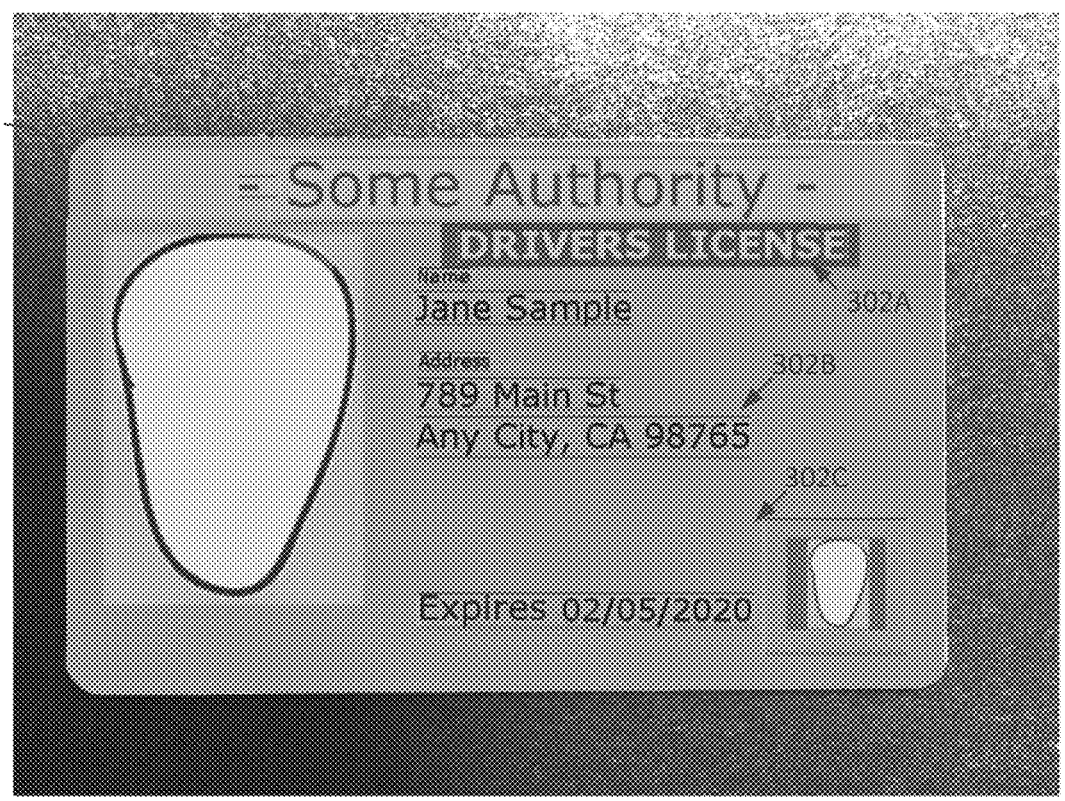

FIG. 3B shows the step of text recognition. In one example, optical character recognition (OCR) is performed on the example photo 300. As illustrated, a first area yields recognized text 302A that corresponds to the title of the identification document. Text 302A generally can point to an issuing authority of the identification document. A second area shows recognized text 302B that corresponds to the personally identifiable information (PII) of the holder of the identification document. Text 302B can also include the address information of the holder. A third area shows text 302C that corresponds to an expiration date of the identification document. Additional areas can yield further textual information, for example, embedded text in an emblem, a ghost image, or a half-tone image.

Figure 3C:
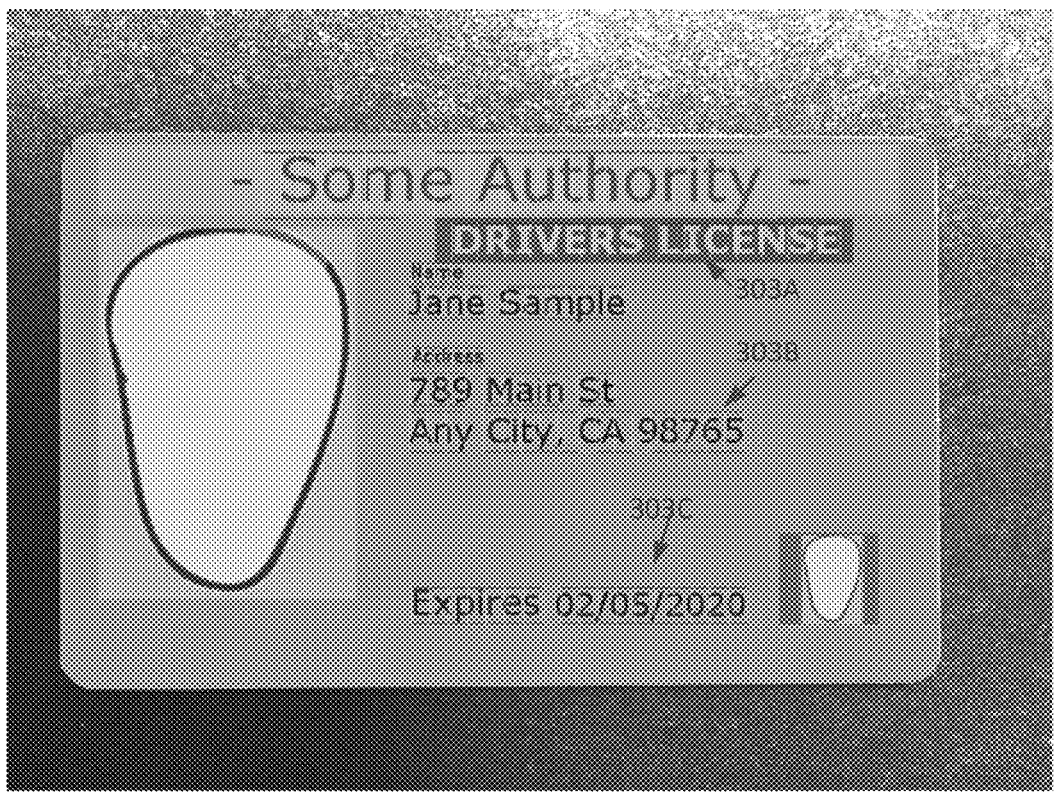

FIG. 3C shows results of estimating the position of the detected text. As illustrated, region 303A corresponds to the estimated positions of the pigeon holes for text 302A. Each position can include coordinate information as well as size information for the corresponding pigeon hole. Similarly, region 303B corresponds to the estimated positions of the pigeon holes for text 302B while region 303C corresponds to the estimated positions of the pigeon holes for text 302C.

Figure 3D:
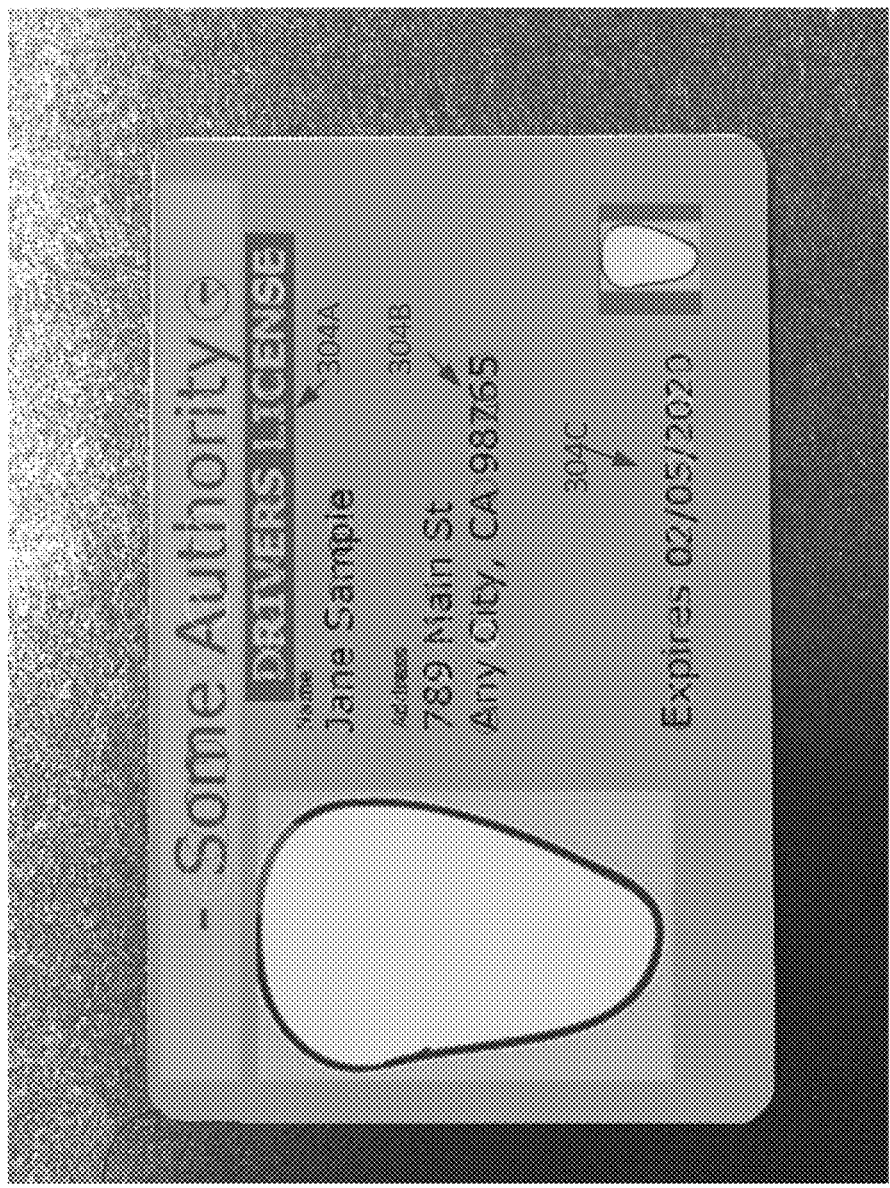

For some cases, FIG. 3D shows the results of defining keypoints that are the points of interest for template extraction and subsequent matching. As illustrated, keypoints are defined in areas 304A, 304B, 304C, which respectively corresponds to regions 303A, 303B, and 303C. For comparison, SIFT keypoints are local feature information extracted from the color or intensity of images at specific locations. Because the local feature information of SIFT keypoints are shift-invariant, such information is often used for object registration. In various implementations of the present disclosure, keypoints are generated from text characters. These keypoints are also shift-invariant. However, these keypoints are not generated automatically by a SIFT algorithm. Instead, during gallery/reference template generation, a user may manually mark the position of the text and identify the individual characters—or potentially the user could just identify the locations of text of interest and then an OCR routine could be run. Notably, the keypoints are defined to facilitate locating a feature set that could be used to detect and register an object (in our case an image of a document). Because of the textual nature of the features used for detection (and template construction), a feature set is naturally understood by a human operator. This new approach leverages text as the features, thereby enabling manual annotation of the features.

With the ability to manually adjust features, the implementations provide the human operator with the visibility into how and why a particular detection is working or failing. The implementations also allow object templates to be constructed by hand because the human operator can simply type text in the correct location on the object. In some cases, the textual string can be no fewer than, for example, three letters, to strike a trade-off between sensitivity performance and specific performance.

Figure 3E:
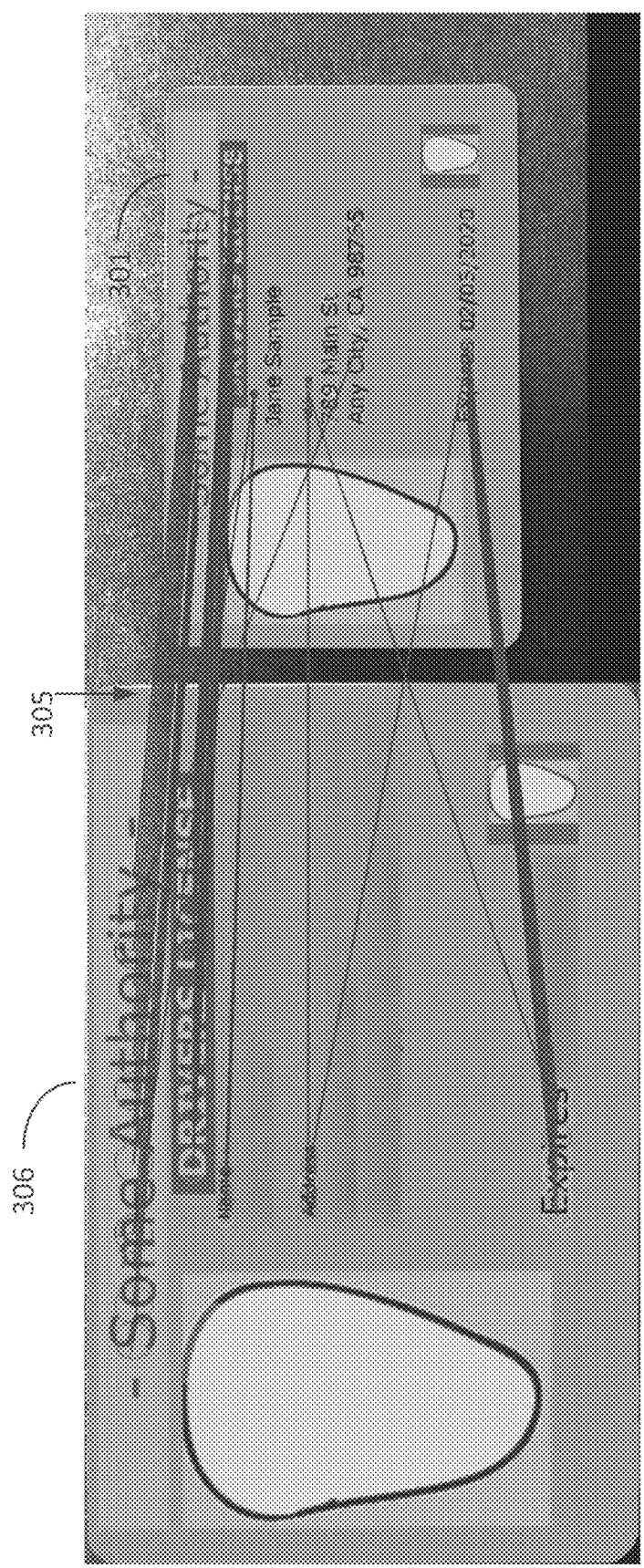

FIG. 3E illustrates an example of a match between the example photo 300 (containing identification document 301) and a template library 306. In this example, the match is provided by projecting a homography 305 between the image and the pre-defined feature template. A homography relates the pixel co-ordinates in the two images when the two images can be related by in projective spaces, for example, when the two images represent viewing the same plane from a different angle, or when the two images are taken from the same camera but from a different angle.

Figure 3F:
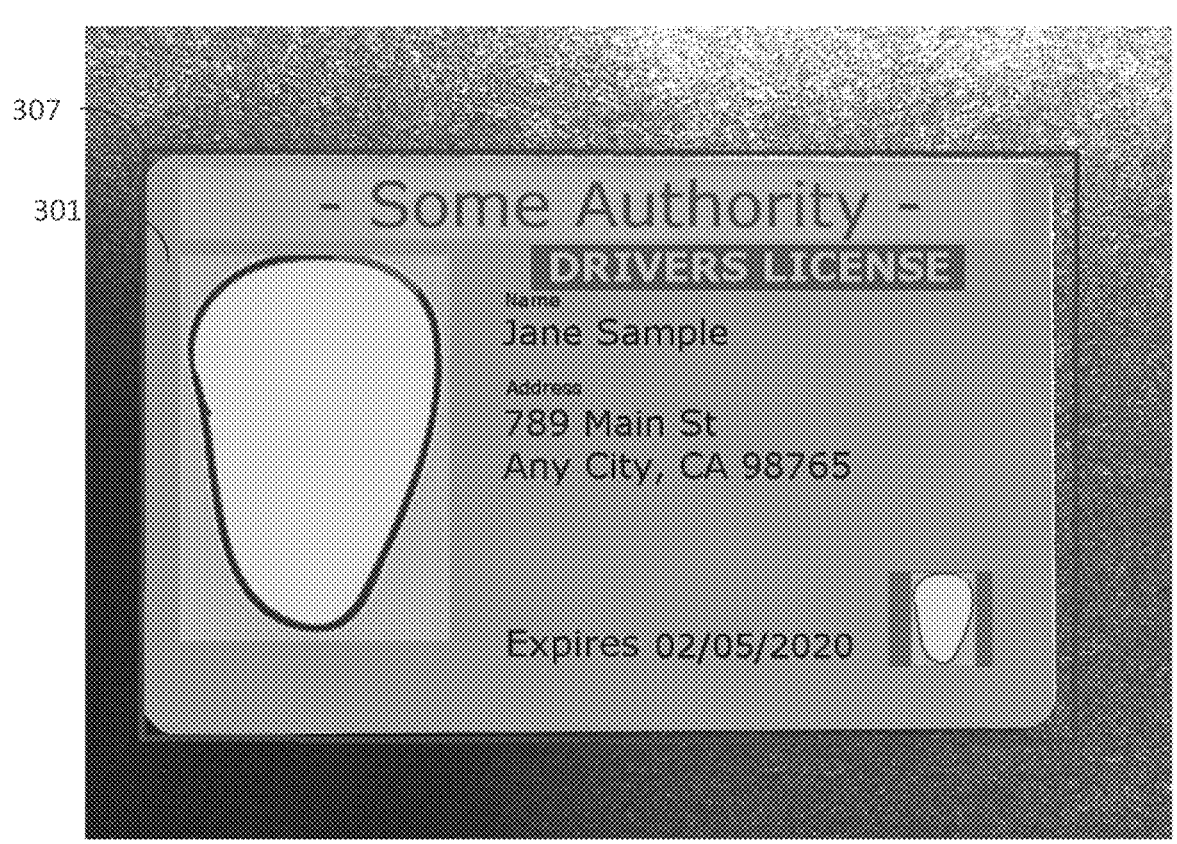
Figure 3G:
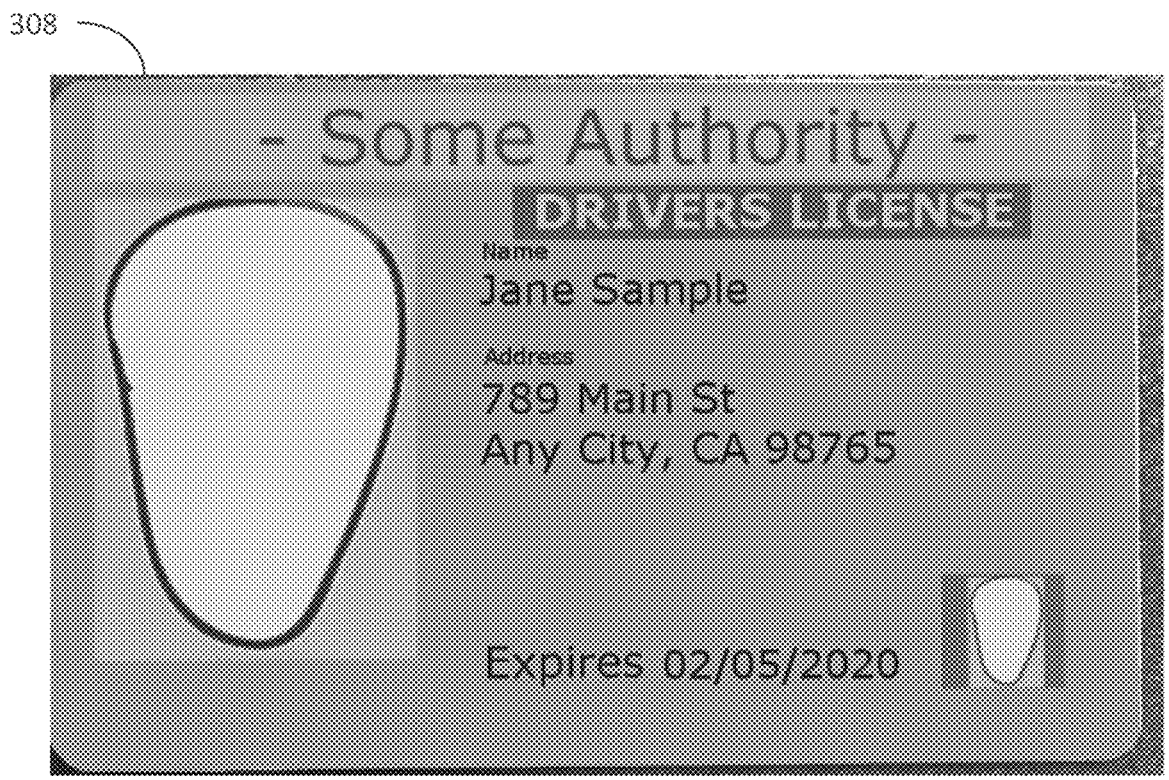

FIG. 3F represents an example of projecting the calculated homography onto the example photo 300 so that the boundaries 307 of the identification document 301 are delineated. FIG. 3G further represents an example of segmenting the identification document 301 based on the projection to generate segmented identification document 308.

Figure 4A:
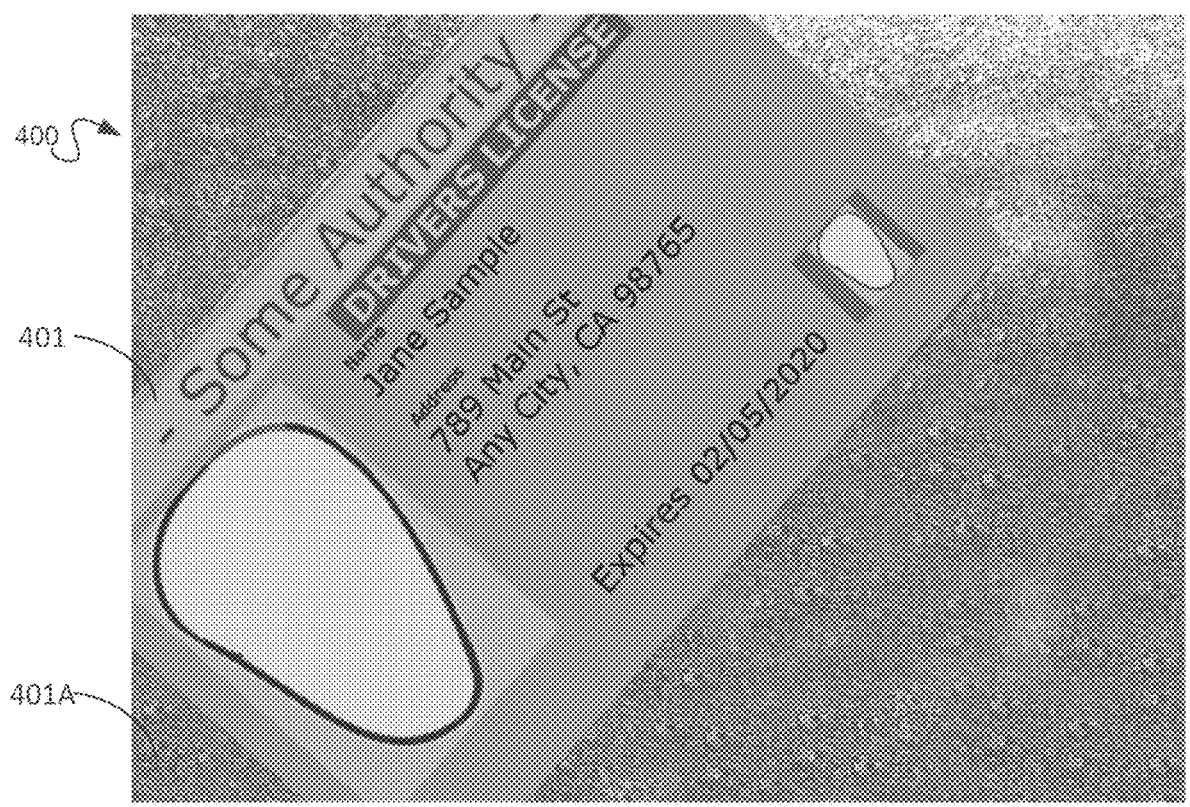
Figure 4B:
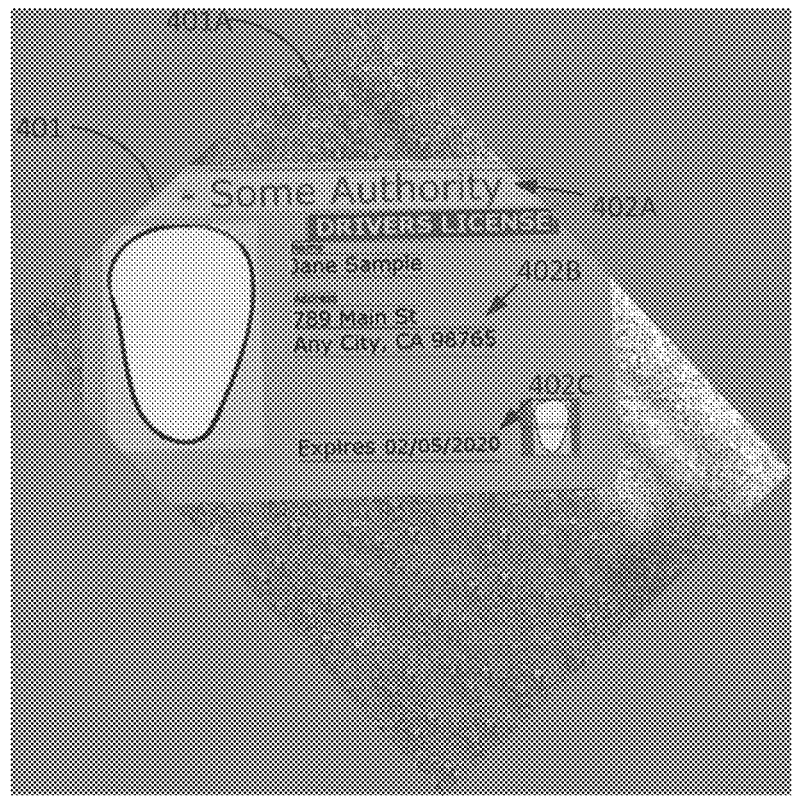
Figure 4C:
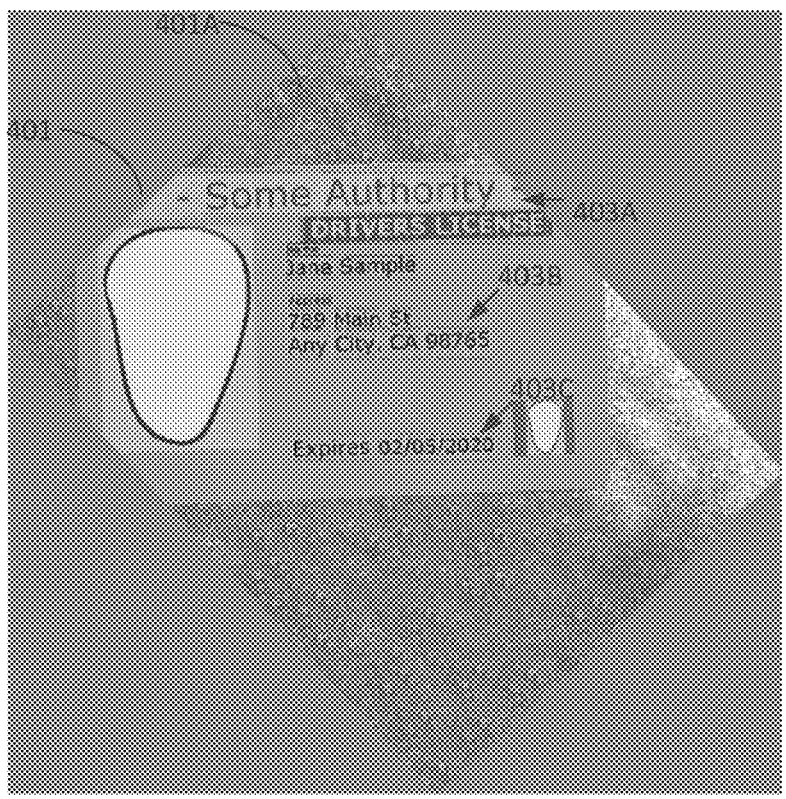
Figure 4D:
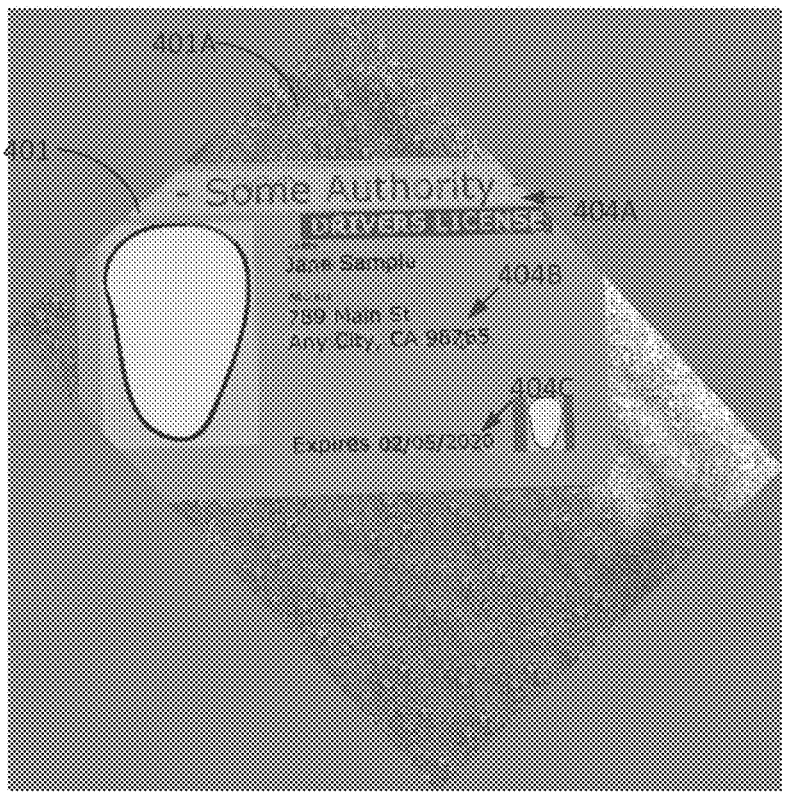
Figure 4F:
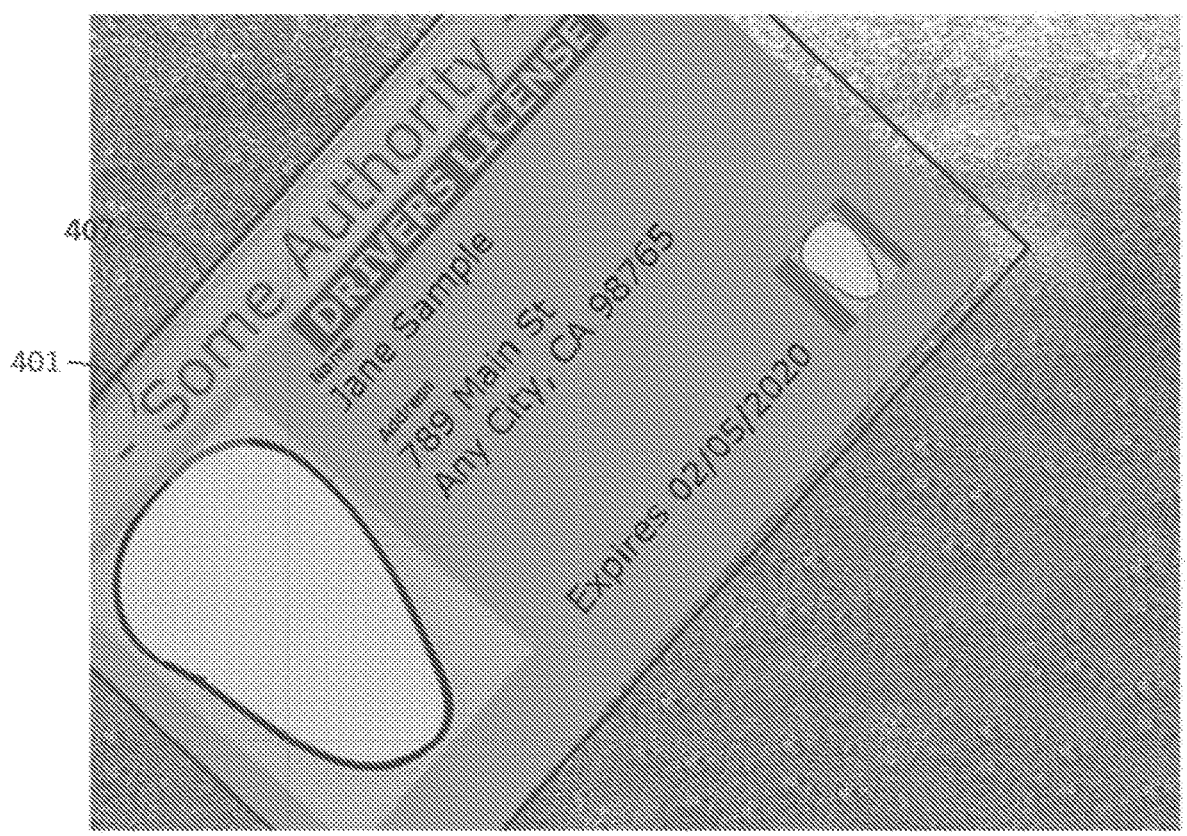
Figure 4G:
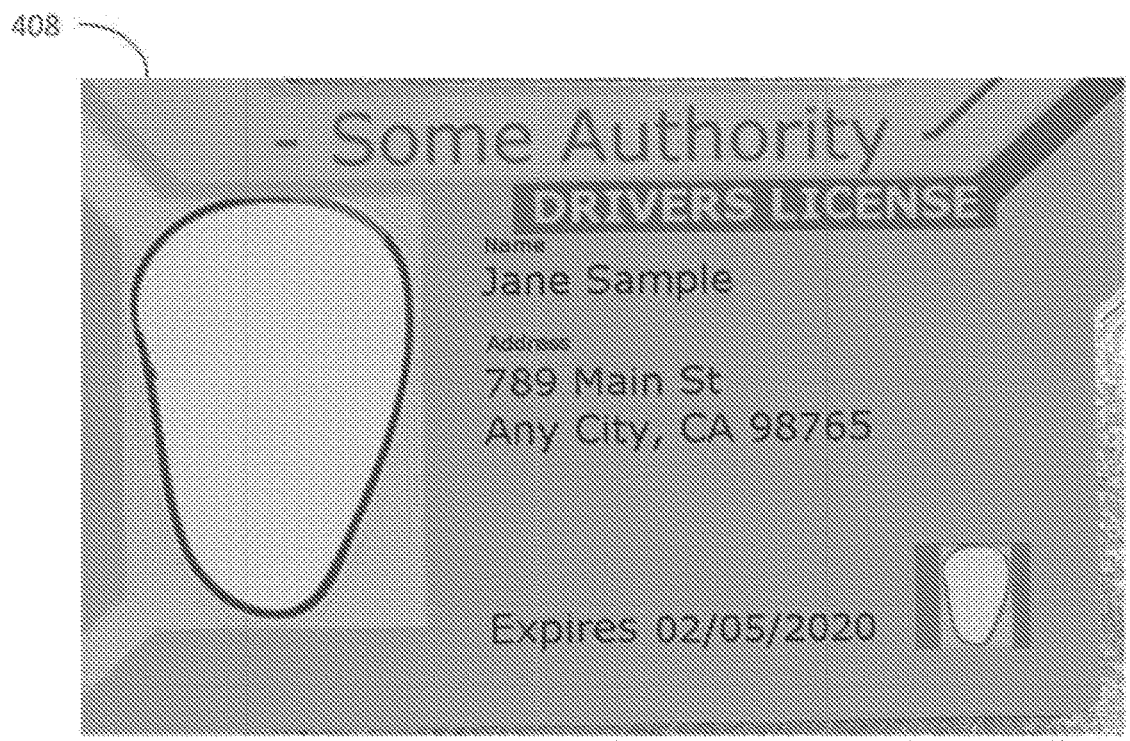

Referring to FIGS. 4A to 4G, steps are illustrated for performing object detection and registration from a second input condition according to an implementation of the present disclosure. FIG. 4A shows an example photo 400 of identification document 401 on background 401A. This example represents a case in which the identification document 401 is in a tilted position and with edges fallen outside the field of view. FIG. 4B shows the step of text recognition, producing recognized text 402A that corresponds to the title of the identification document, recognized text 402B that corresponds to the personally identifiable information (PII) of the holder of the identification document, and recognized text 402C that corresponds to an expiration date of the identification document. FIG. 4C shows results of estimating the position of the detected text. Here, region 403A corresponds to the estimated positions of the pigeon holes for text 402A, region 403B corresponds to the estimated positions of the pigeon holes for text 402B, and region 403C corresponds to the estimated positions of the pigeon holes for text 402C. FIG. 4D shows the results of defining keypoints that are the points of interest for template extraction and subsequent matching. As illustrated, keypoints are defined in areas 404A, 404B, 404C, which respectively corresponds to regions 403A, 403B, and 403C. FIG. 4E illustrates an example of a homograph projection 405 between the example photo 400 (containing identification document 401) and a template library 406. FIG. 4F represents an example of projecting the calculated homography onto the example photo 400 so that the boundaries 407 of the identification document 401 are delineated. FIG. 4G further represents an example of segmenting the identification document 401 based on the projection to generate a segmented identification document 408.

Figure 5A:
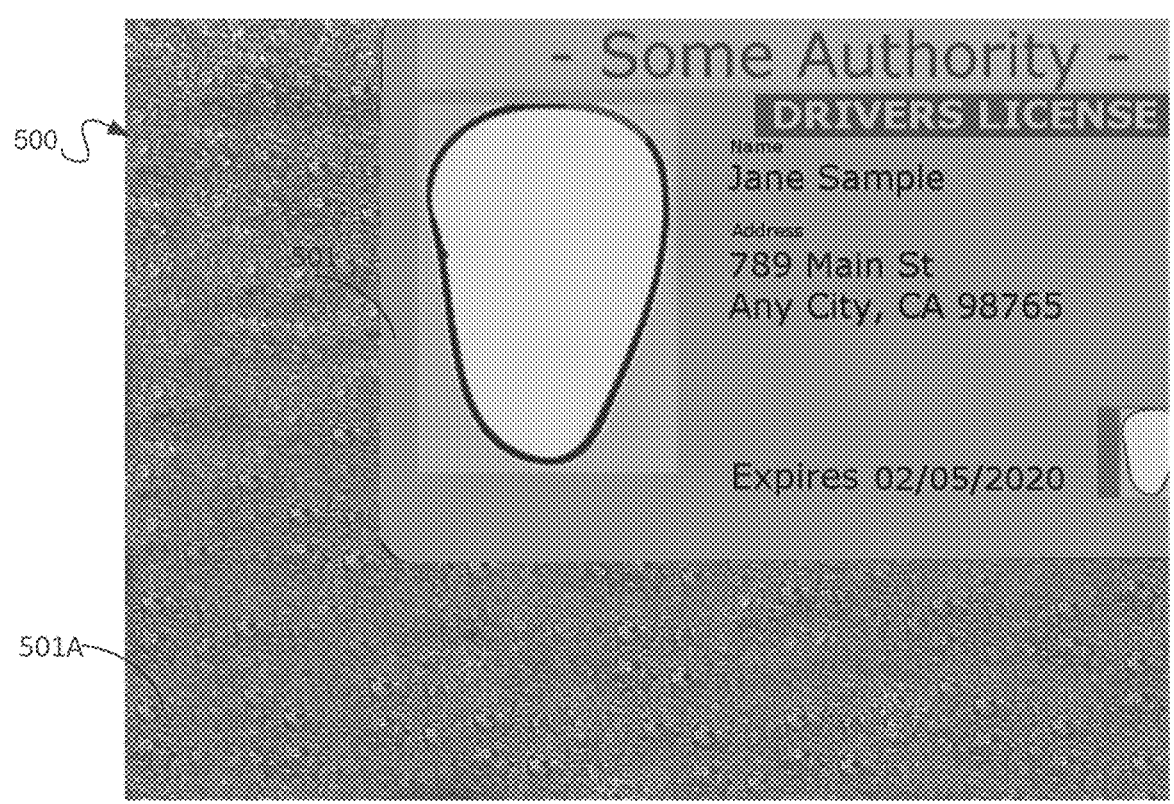
FIG. 5A to 5G illustrate examples of illustrate examples of performing object detection and registration from a third input condition according to an implementation of the present disclosure.
Figure 5B:
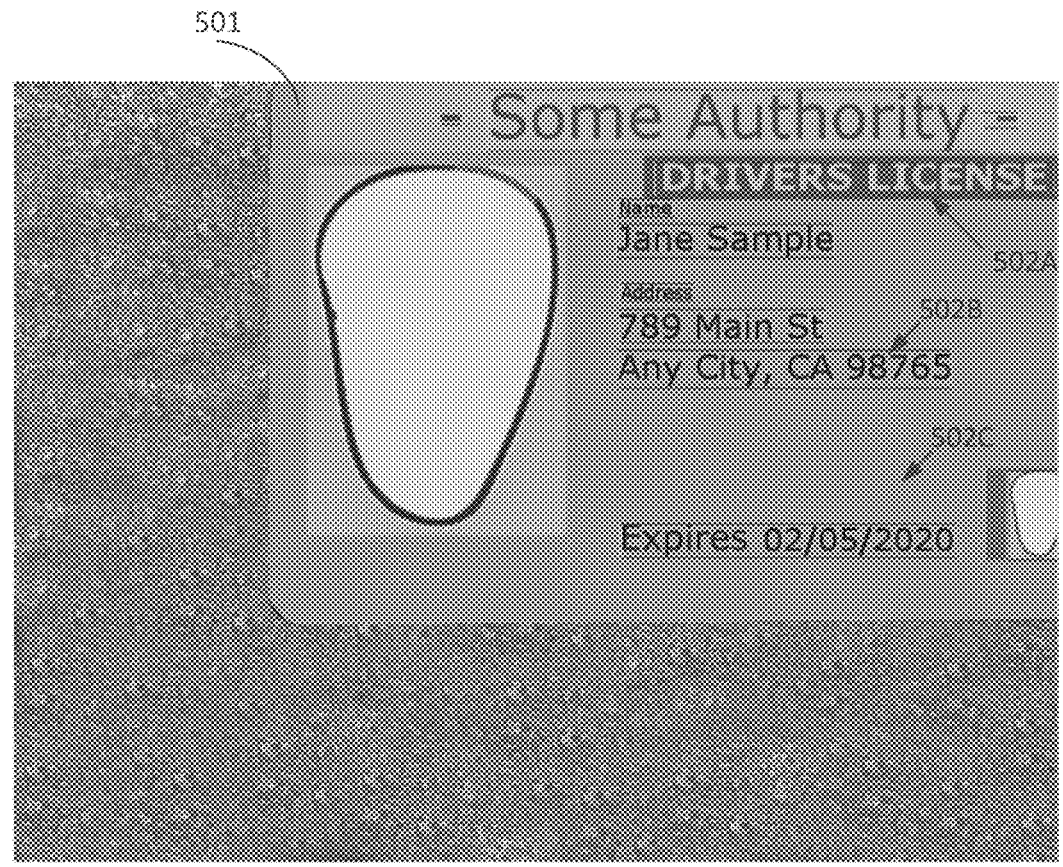
Figure 5C:
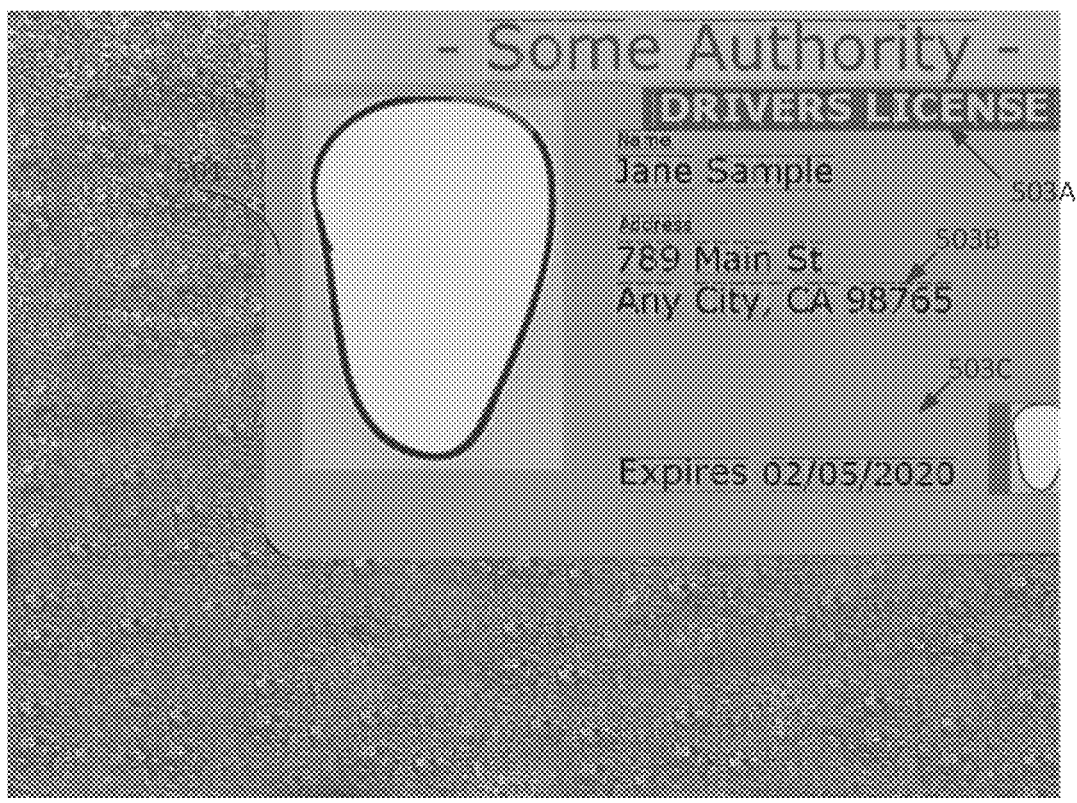
Figure 5D:
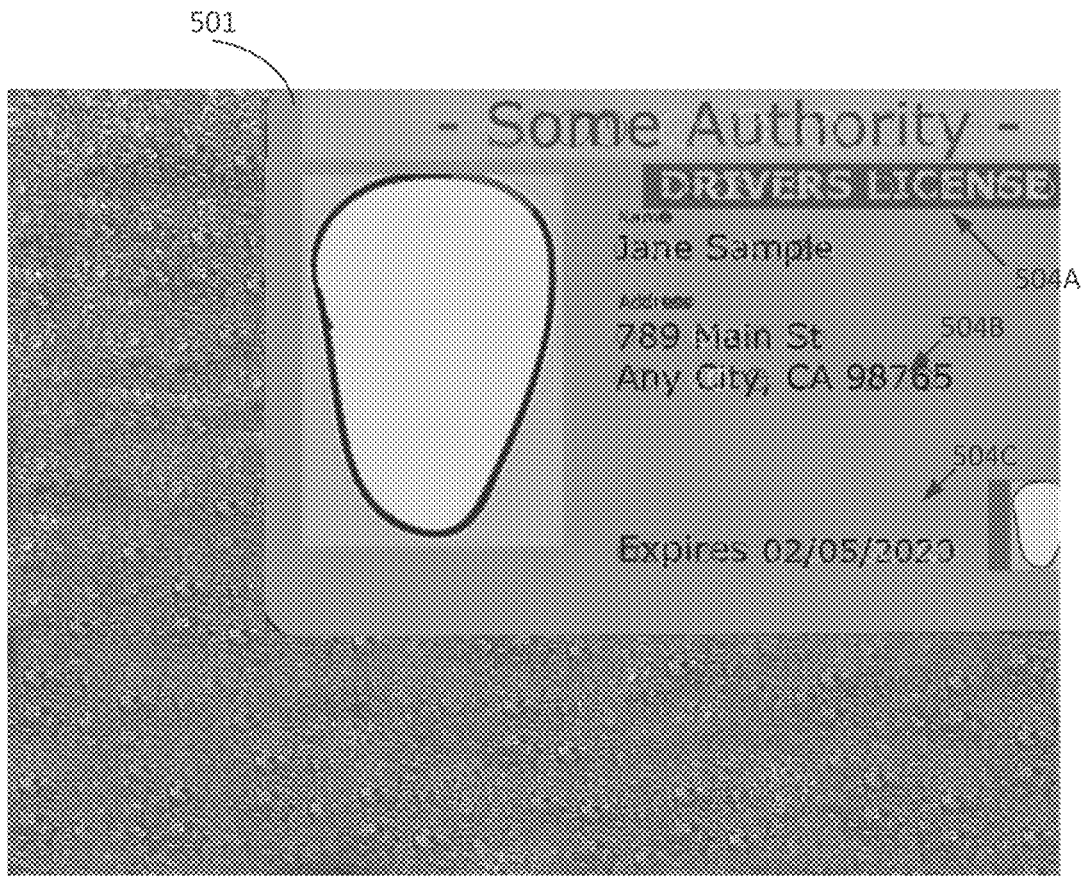
Figure 5E:
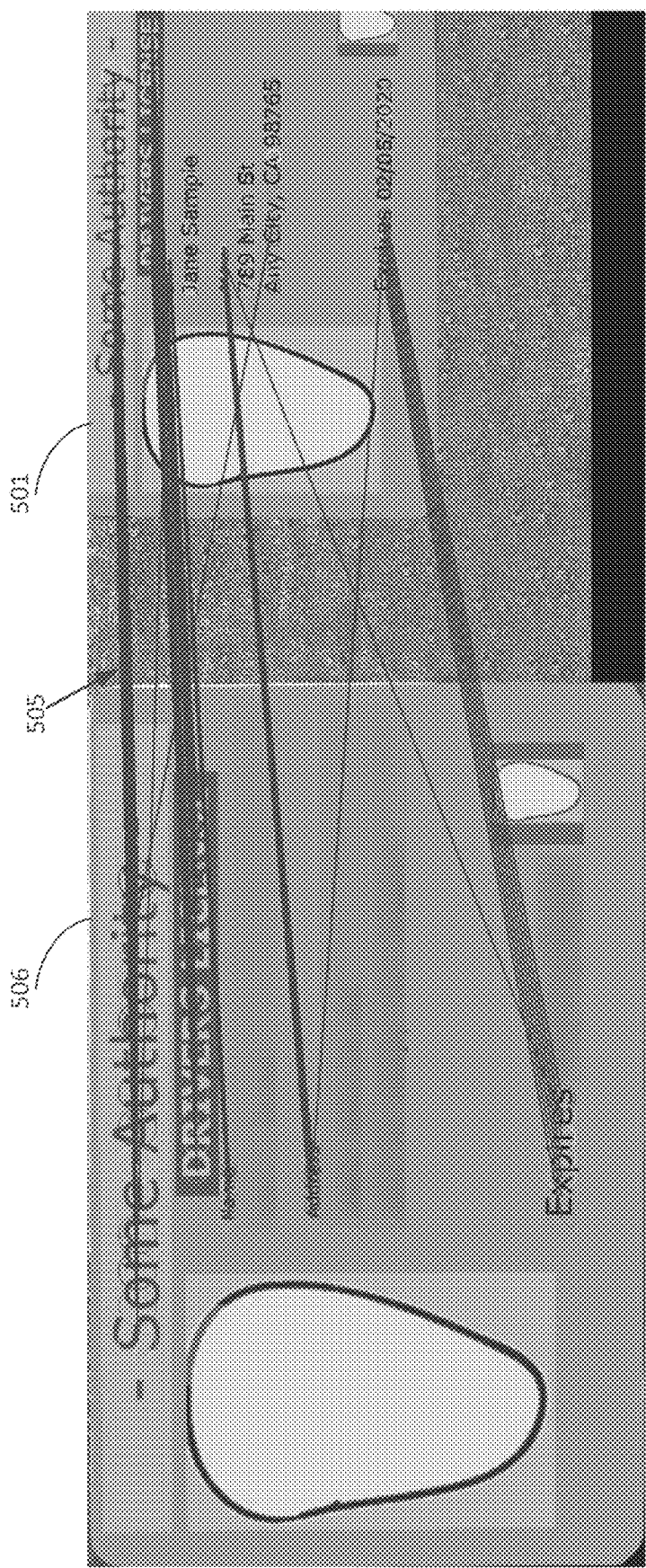
Figure 5F:
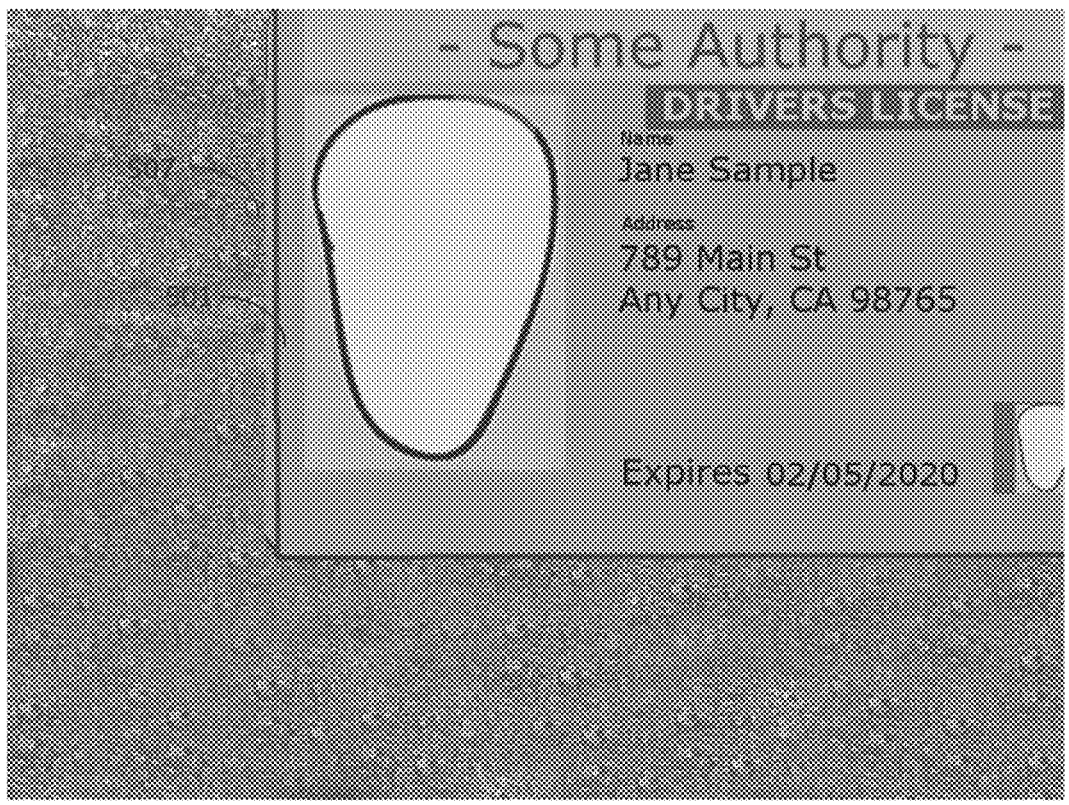
Figure 5G:
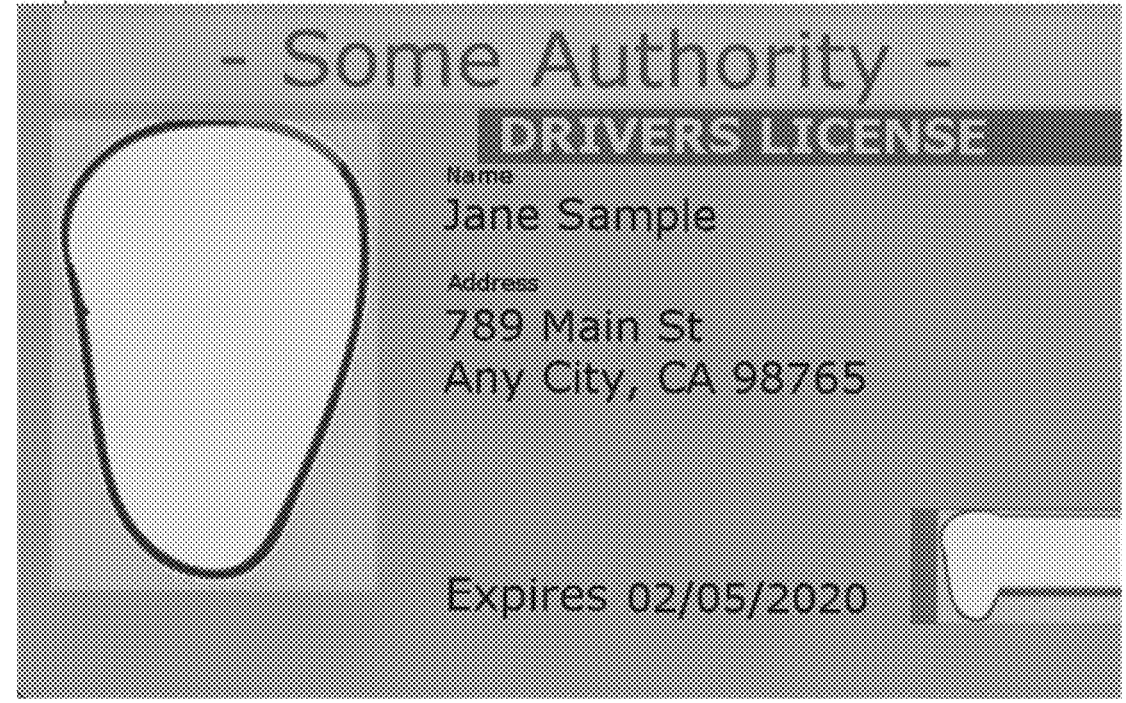

Referring to FIGS. 5A to 5G, steps are illustrated for performing object detection and registration from a third input condition according to an implementation of the present disclosure. FIG. 5A shows an example photo 500 of identification document 501 on background 501A. This example represents a case in which the identification document 501 is positioned with the left side edge outside the field of view. FIG. 5B shows the step of text recognition, producing recognized text 502A that corresponds to the title of the identification document, recognized text 502B that corresponds to the personally identifiable information (PII) of the holder of the identification document, and recognized text 502C that corresponds to an expiration date of the identification document. FIG. 5C shows results of estimating the position of the detected text. Here, region 503A corresponds to the estimated positions of the pigeon holes for text 502A, region 503B corresponds to the estimated positions of the pigeon holes for text 502B, and region 503C corresponds to the estimated positions of the pigeon holes for text 502C. FIG. 5D shows the results of defining keypoints that are the points of interest for template extraction and subsequent matching. As illustrated, keypoints are defined in areas 504A, 504B, 504C, which respectively corresponds to regions 503A, 503B, and 503C. FIG. 5E illustrates an example of a homograph projection 505 between the example photo 500 (containing identification document 501) and a template library 506. FIG. 5F represents an example of projecting the calculated homography onto the example photo 500 so that the boundaries 507 of the identification document 501 are delineated. FIG. 5G further represents an example of segmenting the identification document 501 based on the projection to generate a segmented identification document 508.

Figure 6A:
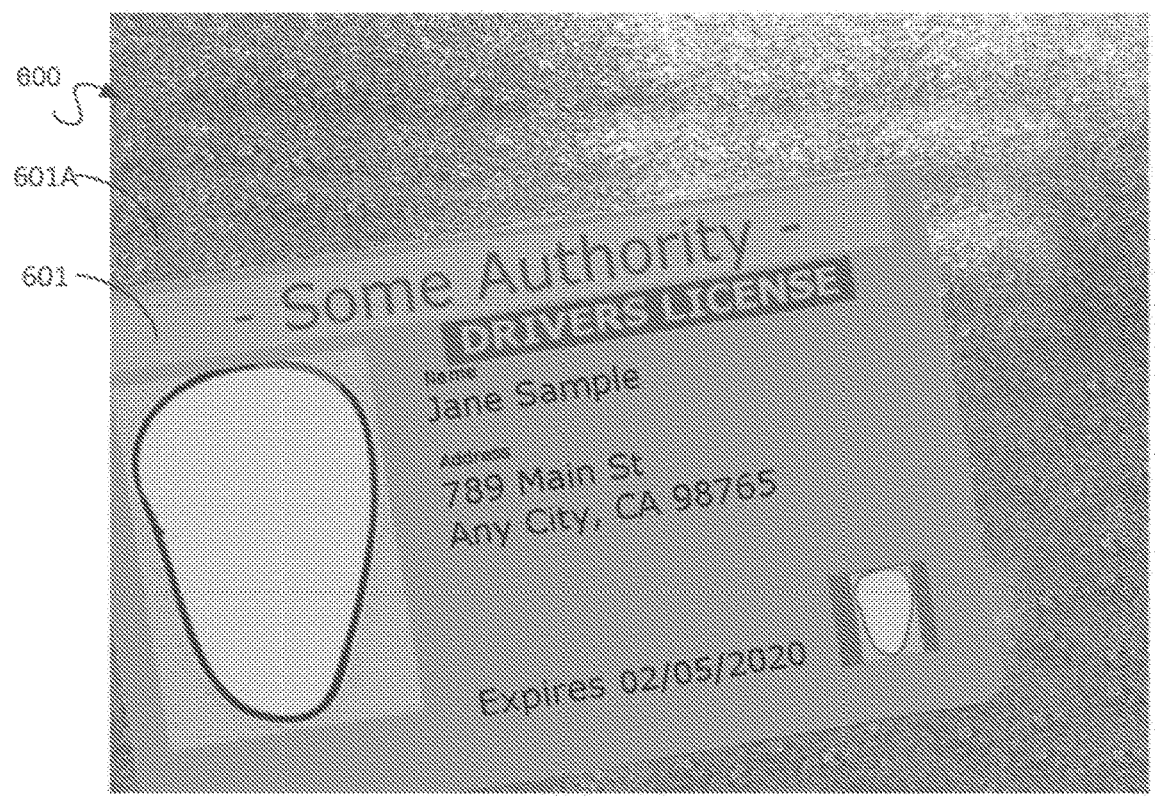
FIG. 6A to 6G illustrate examples of illustrate examples of performing object detection and registration from a fourth input condition according to an implementation of the present disclosure.
Figure 6B:
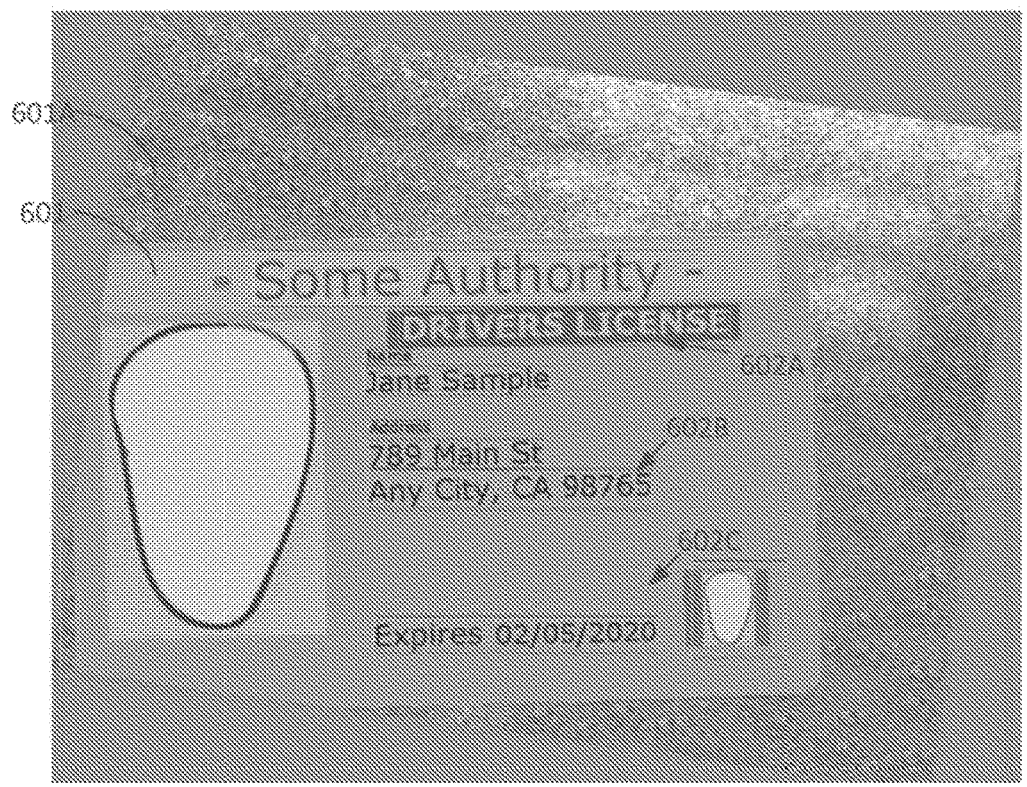
Figure 6C:
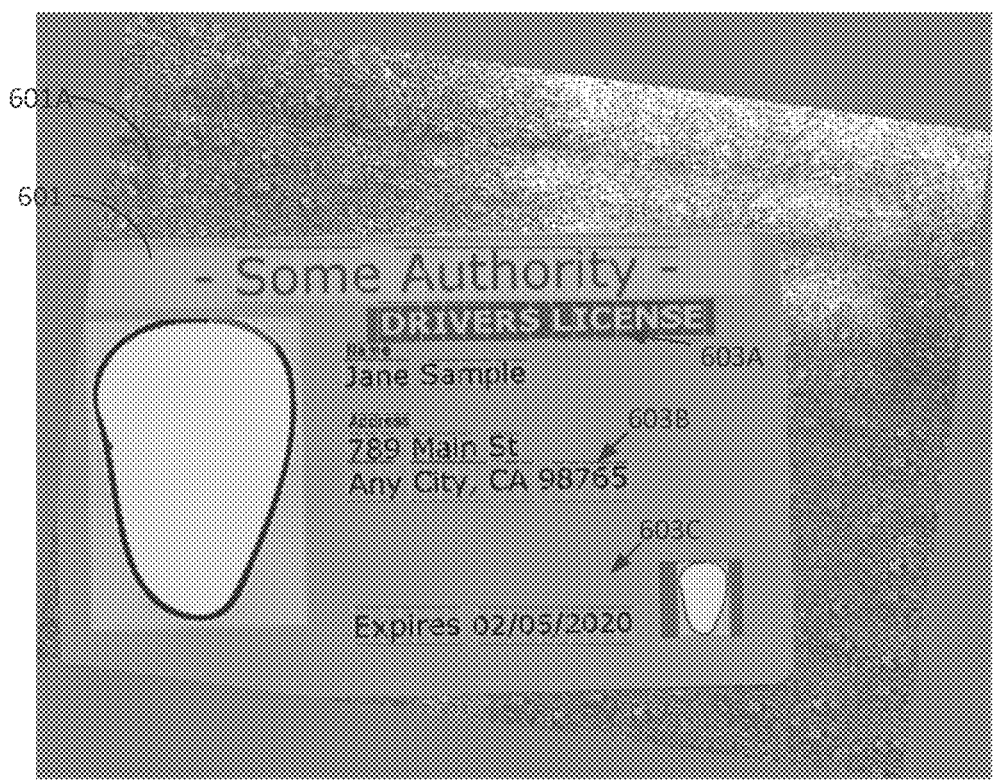
Figure 6D:
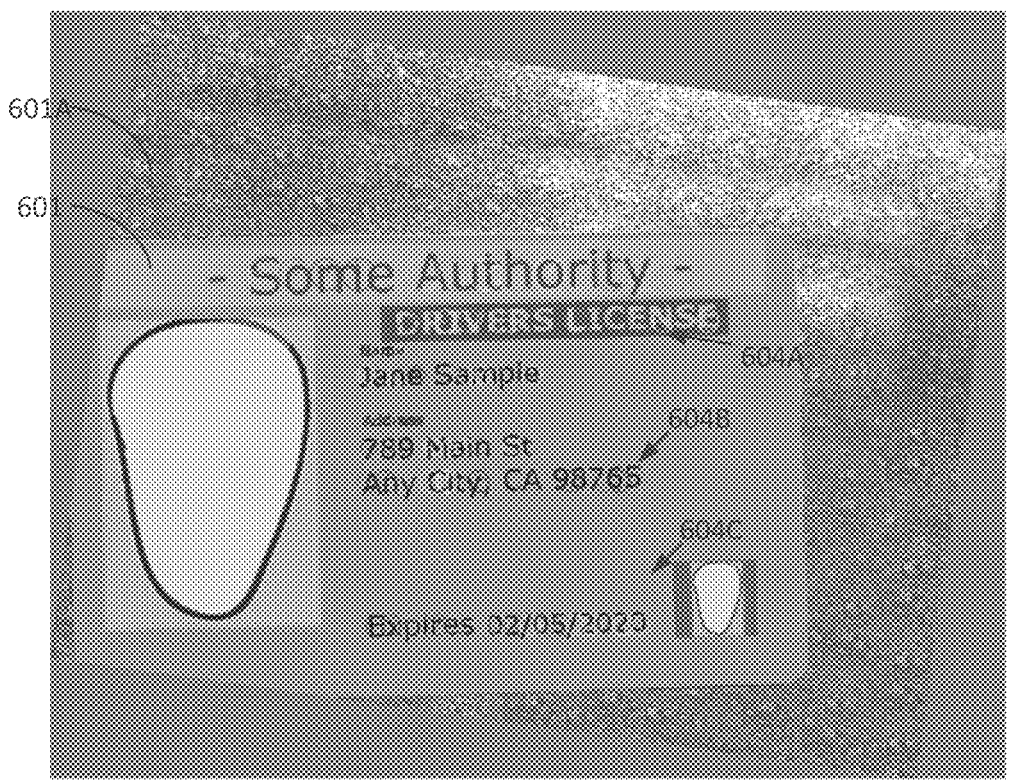
Figure 6E:
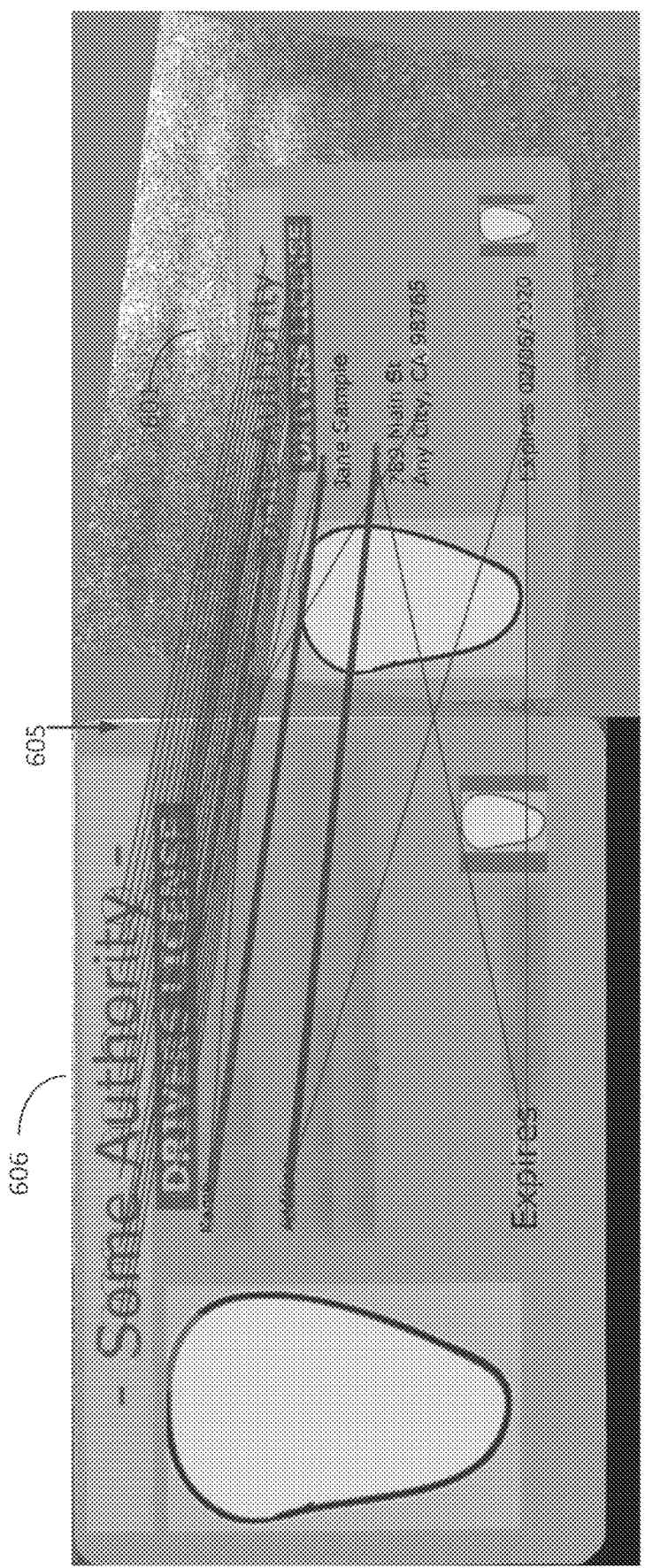
Figure 6F:
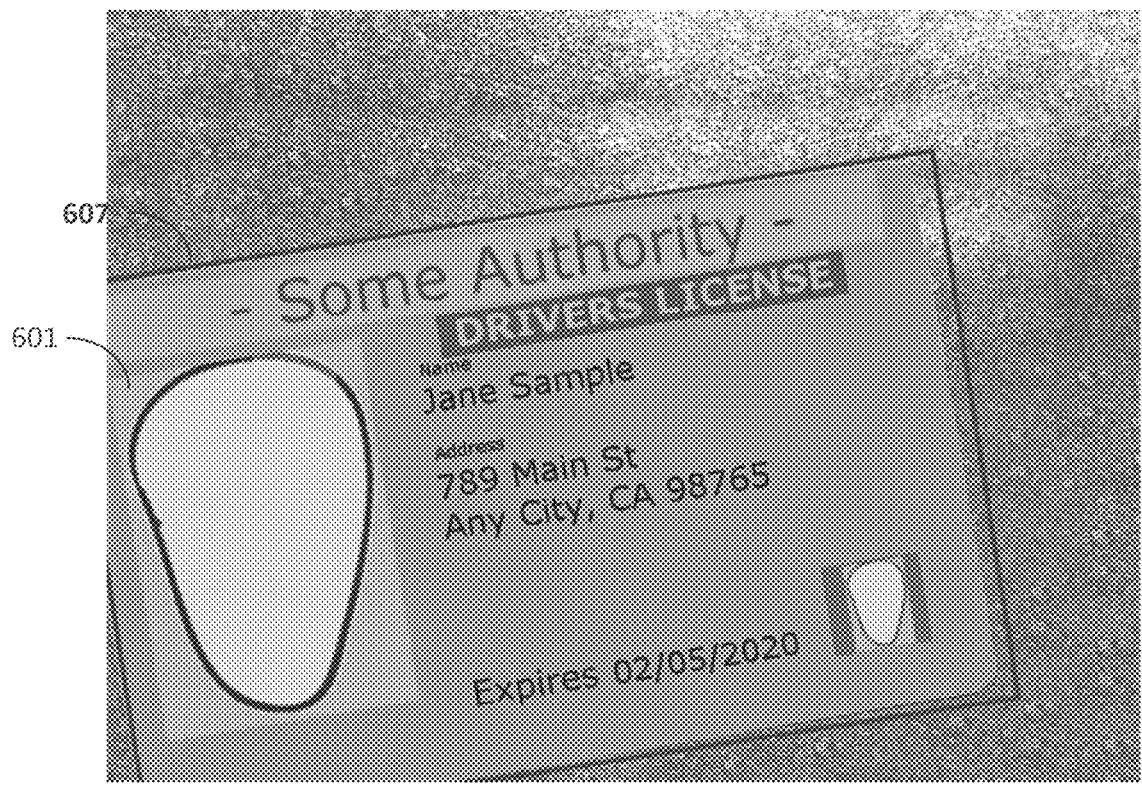
Figure 6G:

Referring to FIGS. 6A to 6G, steps are illustrated for performing object detection and registration from a fourth input condition according to an implementation of the present disclosure. FIG. 6A shows an example photo 600 of identification document 601 on background 601A. This example represents a case in which the identification document 601 is positioned towards the lower left corner of background 601A and with the upper left corner edge outside the field of view. FIG. 6B shows the step of text recognition, producing recognized text 602A that corresponds to the title of the identification document, recognized text 602B that corresponds to the personally identifiable information (PII) of the holder of the identification document, and recognized text 602C that corresponds to an expiration date of the identification document. FIG. 6C shows results of estimating the position of the detected text. Here, region 603A corresponds to the estimated positions of the pigeon holes for text 602A, region 603B corresponds to the estimated positions of the pigeon holes for text 602B, and region 603C corresponds to the estimated positions of the pigeon holes for text 602C. FIG. 6D shows the results of defining keypoints that are the points of interest for template extraction and subsequent matching. As illustrated, keypoints are defined in areas 604A, 604B, 604C, which respectively corresponds to regions 603A, 603B, and 603C. FIG. 6E illustrates an example of a homograph projection 605 between the example photo 600 (containing identification document 601) and a template library 606. FIG. 6F represents an example of projecting the calculated homography onto the example photo 600 so that the boundaries 607 of the identification document 601 are delineated. FIG. 6G further represents an example of segmenting the identification document 601 based on the projection to generate a segmented identification document 608.

Figure 7:
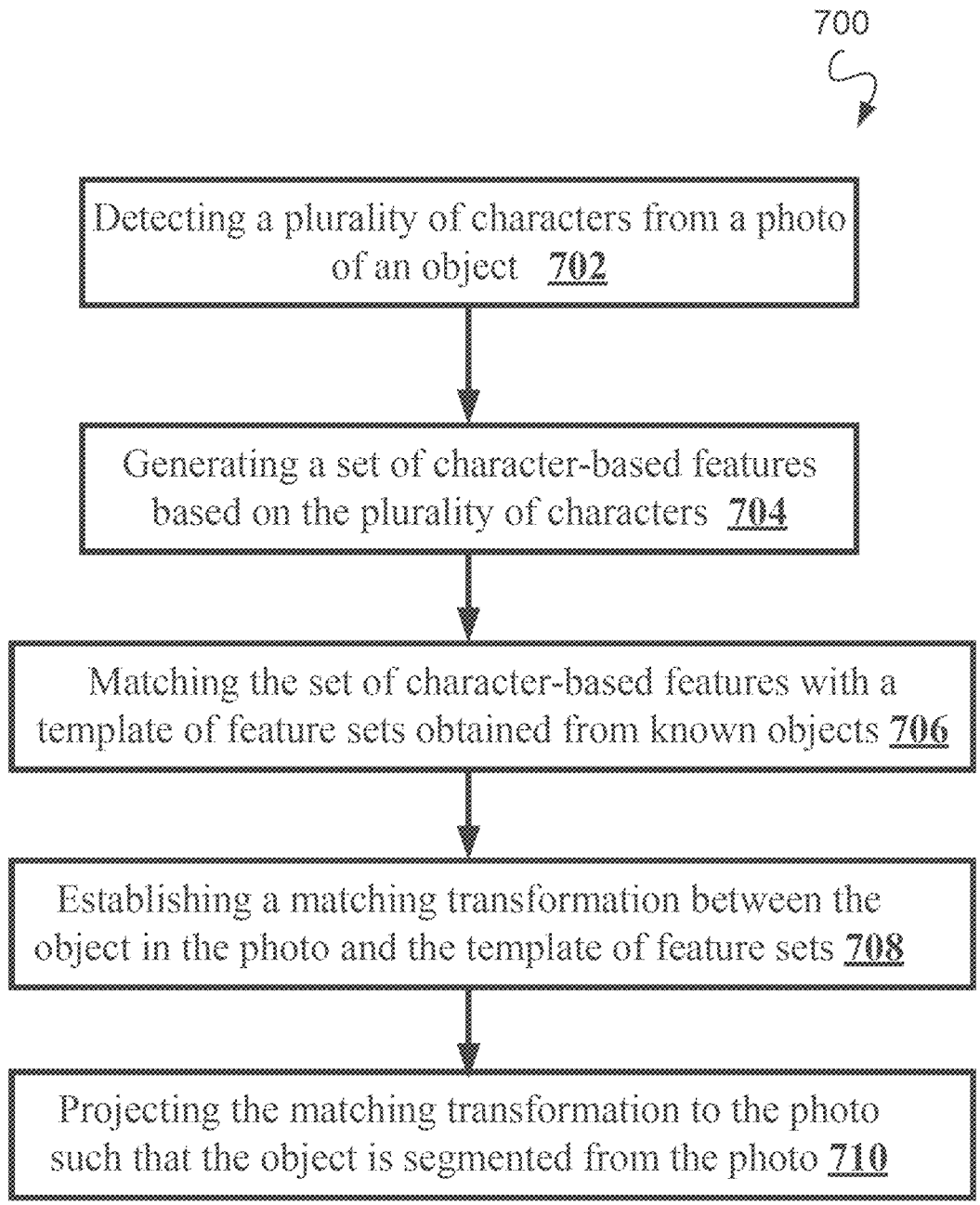
FIG. 7 illustrates an example of a flow chart according to some implementations of the present disclosure.

FIG. 7 is a flow chart 700 showing an example of workflow. A digital photo is received from a user device when the user requests a transaction at a server (or a software as a service). Initially, the server detects a plurality of characters from a photo of an object (e.g., an identification document) (702). The position for each of the detected characters is also detected. The server then generates a set of character-based features based on the detected characters and the respective positions (704). The server then matches the set of character-based features with a template of feature sets obtained from known objects (for example, prior detected identification documents) (706). The matching process may yield a ranked list of the top matches. The top matching candidates can be the top 10 candidates with the highest matching score. The top candidates can also be the set of candidates with a matching score above a threshold. A matching transformation is then established between the object in the photo and the template of feature sets (708). The matching transformation may then be projected to the photo such that the object (e.g., the identification document) is segmented from the photo (710).

Figure 8:
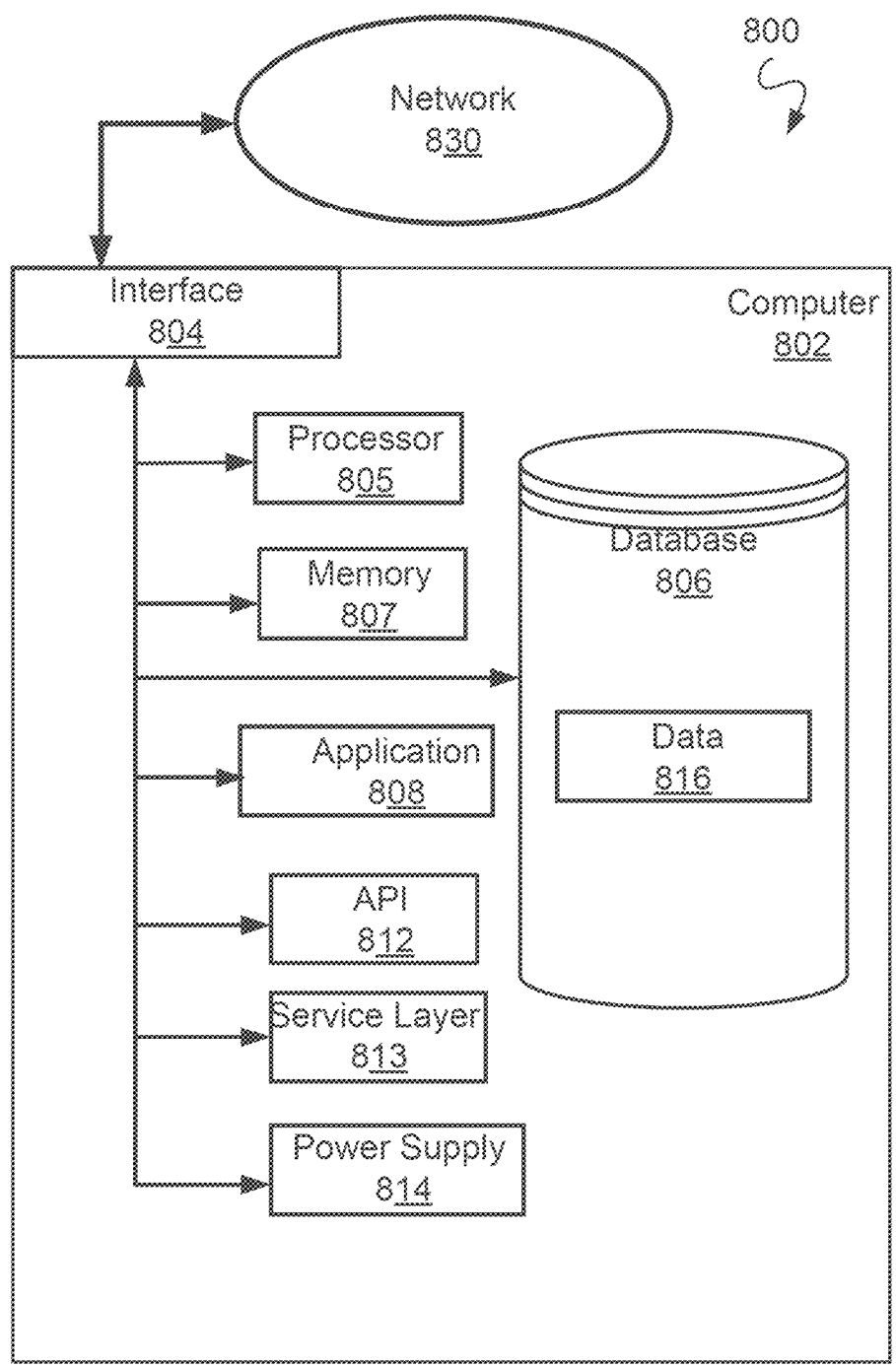
FIG. 8 is a block diagram illustrating an example of a computer system used to provide computational functionalities associated with described algorithms, methods, functions, processes, flows, and procedures, according to an implementation of the present disclosure.

FIG. 8 is a block diagram illustrating an example of a computer system 800 used to provide computational functionalities associated with described algorithms, methods, functions, processes, flows, and procedures, according to an implementation of the present disclosure. The illustrated computer 802 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 802 can comprise a computer that includes an input device, such as a keypad, keyboard, touch screen, another input device, or a combination of input devices that can accept user information, and an output device that conveys information associated with the operation of the computer 802, including digital data, visual, audio, another type of information, or a combination of types of information, on a graphical-type user interface (UI) (or GUI) or other UI.

The computer 802 can serve in a role in a computer system as a client, network component, a server, a database or another persistency, another role, or a combination of roles for performing the subject matter described in the present disclosure. The illustrated computer 802 is communicably coupled with a network 830. In some implementations, one or more components of the computer 802 can be configured to operate within an environment, including cloud-computing-based, local, global, another environment, or a combination of environments.

The computer 802 is an electronic computing device operable to receive, transmit, process, store, or manage data and information associated with the described subject matter. According to some implementations, the computer 802 can also include or be communicably coupled with a server, including an application server, e-mail server, web server, caching server, streaming data server, another server, or a combination of servers.

The computer 802 can receive requests over network 830 (for example, from a client software application executing on another computer 802) and respond to the received requests by processing the received requests using a software application or a combination of software applications. In addition, requests can also be sent to the computer 802 from internal users, external or third-parties, or other entities, individuals, systems, or computers.

In some implementations, any or all of the components of the computer 802, including hardware, software, or a combination of hardware and software, can interface using an application programming interface (API) 812, a service layer 813, or a combination of the API 812 and service layer 813. The API 812 can include specifications for routines, data structures, and object classes. The API 812 can be either computer-language independent or dependent and refer to a complete interface, a single function, or even a set of APIs. The service layer 813 provides software services to the computer 802 or other components (whether illustrated or not) that are communicably coupled to the computer 802. The functionality of the computer 802 can be accessible for all service consumers using this service layer. Software services, such as those provided by the service layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 802, alternative implementations can illustrate the API 812 or the service layer 813 as stand-alone components in relation to other components of the computer 802 or other components (whether illustrated or not) that are communicably coupled to the computer 802. Moreover, any or all parts of the API 812 or the service layer 813 can be implemented as a child or a sub-module of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802. The interface 804 is used by the computer 802 for communicating with another computing system (whether illustrated or not) that is communicatively linked to the network 830 in a distributed environment. Generally, the interface 804 is operable to communicate with the network 830 and comprises logic encoded in software, hardware, or a combination of software and hardware. More specifically, the interface 804 can comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors can be used according to particular needs, desires, or particular implementations of the computer 802. Generally, the processor 805 executes instructions and manipulates data to perform the operations of the computer 802 and any algorithms, methods, functions, processes, flows, and procedures as described in the present disclosure.

The computer 802 also includes a database 806 that can hold data 816 for the computer 802, another component communicatively linked to the network 830 (whether illustrated or not), or a combination of the computer 802 and another component. For example, database 806 can be an in-memory, conventional, or another type of database storing data consistent with the present disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, the database can be implemented as a distributed database in which, for example, template library 606 can reside as data 816 in a distributed manner spanning over several hardware locations.

The computer 802 also includes a memory 807 that can hold data for the computer 802, another component or components communicatively linked to the network 830 (whether illustrated or not), or a combination of the computer 802 and another component. Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 or similar or differing types can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in the present disclosure. For example, application 808 can serve as one or more components, modules, or applications. Further, although illustrated as a single application 808, the application 808 can be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or another power management functionality). In some implementations, the power-supply 814 can include a power plug to allow the computer 802 to be plugged into a wall socket or another power source to, for example, power the computer 802 or recharge a rechargeable battery.

There can be any number of computers 802 associated with, or external to, a computer system containing computer 802, each computer 802 communicating over network 830. Further, the term "client," "user," or other appropriate terminology can be used interchangeably, as appropriate, without departing from the scope of the present disclosure. Moreover, the present disclosure contemplates that many users can use one computer 802, or that one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    generating a set of character-based features extracted from an object in a photo;
    based on, at least in part, the set of character-based features, identifying a matching transformation capable of being projected to the photo containing the object such that the object is segmented from the photo;
    in response to identifying the matching transformation, providing, to a template of feature sets, the set of character-based features extracted from the object in the photo;
    matching the template of feature sets with a later set of character-based features extracted from an object in a later received photo;
    based on a matching set of character-based features, establishing a later matching transformation between the object in the later received photo and the template of feature sets; and projecting the later matching transformation to the later received photo such that the object on the later received photo is segmented from the later received photo.

2. The computer-implemented method of claim 1, wherein the object comprises: an identification document.

3. The computer-implemented method of claim 1, further comprising:
providing, to the template of feature sets, the later set of character-based features extracted from the object in the later received photo.

4. The computer-implemented method of claim 1, wherein the set of characters comprise: a triplet of characters.

5. The computer-implemented method of claim 1, wherein generating a set of character-based features comprises:
estimating spatial coordinates for each character from the set of characters.

6. The computer-implemented method of claim 1, wherein identifying a matching transformation comprises identifying a homography capable of projecting a rotation of the photo, a translation of the photo, and a scaling of the photo.

* * * * *